(12) United States Patent
Kitajima et al.

(10) Patent No.: US 7,401,748 B2
(45) Date of Patent: Jul. 22, 2008

(54) SPOOL ASSEMBLY FOR SPINNING REEL

(75) Inventors: Keigo Kitajima, Osaka (JP); Hirokazu Hiraoka, Osaka (JP); Shingo Matsuo, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/941,492

(22) Filed: Nov. 16, 2007

(65) Prior Publication Data
US 2008/0142628 A1    Jun. 19, 2008

(51) Int. Cl.
*A01K 89/02* (2006.01)
(52) U.S. Cl. .................. 242/322; 242/306; 242/307
(58) Field of Classification Search .......... 242/322, 242/306, 307; D22/140, 141
See application file for complete search history.

(56) References Cited

U.S. PATENT DOCUMENTS

| | | | | |
|---|---|---|---|---|
| 5,279,477 | A * | 1/1994 | Yoshikawa | 242/306 |
| 6,655,622 | B2 * | 12/2003 | Kitajima et al. | 242/322 |
| 6,688,545 | B2 * | 2/2004 | Kitajima et al. | 242/306 |
| 6,978,957 | B2 * | 12/2005 | Sugawara | 242/322 |
| 7,104,485 | B2 * | 9/2006 | Sugahara | 242/307 |
| 2004/0041045 | A1 * | 3/2004 | Sugawara | 242/307 |
| 2004/0251363 | A1 * | 12/2004 | Sugawara | 242/322 |

FOREIGN PATENT DOCUMENTS

JP    2004-081097 A    3/2004

* cited by examiner

*Primary Examiner*—Emmanuel M Marcelo
(74) *Attorney, Agent, or Firm*—Shinjyu Global IP

(57) ABSTRACT

An object of the present invention is to make it possible to easily attach a sound producing mechanism to a spool of a spinning reel and to compactly dispose the spool. An annular attachment member to which a hitting member of a sound producing mechanism is attached is detachably/reattachably mounted and fixed in an attachment recess that is formed to be annularly concaved in an inner peripheral portion of a bobbin trunk. Here, the annular attachment member is completely mounted in the attachment recess that is formed to be annularly concaved. Accordingly, it is possible to easily attach the attachment member to the attachment recess, and it is also possible to uniformly maintain the weight balance of a spool in the peripheral direction. In addition, here, the attachment member is mounted in the attachment recess. Thus, the attachment member is not likely to protrude backward from a rear end portion of the bobbin trunk, compared to the conventional configuration. Accordingly, it is possible to compactly dispose the spool.

15 Claims, 13 Drawing Sheets

SPOOL ASSEMBLY FOR SPINNING REEL

CROSS-REFERENCE TO THE RELATED APPLICATIONS

This application claims priority to Japanese Patent Application Nos. 2006-341292 and 2006-341293. The entire disclosure of Japanese Patent Application Nos. 2006-341292 and 2006-341293 is hereby incorporated herein by reference.

TECHNICAL FIELD

The present invention relates to a spool, in particular to a spool of a spinning reel that is mounted on a reel unit so as to be capable of moving in a front-to-rear direction and fishing line is wound on the outer periphery thereof.

BACKGROUND ART

In general, a spinning reel includes a reel unit, a rotor that is rotatably supported on the reel unit, and a spool that is disposed in front of the rotor and fishing line is wound on the outer periphery thereof.

This type of spool includes a bobbin trunk that fishing line is wound around the outer periphery thereof, a front flange portion that is mounted to the front end portion of the bobbin trunk and the diameter thereof is formed to be larger than the maximum outer diameter of the bobbin trunk, and a skirt portion that is mounted to the rear end portion of the bobbin trunk and is formed in a tubular shape with a diameter larger than the maximum outer diameter of the bobbin trunk. Also, as to a front drag spinning reel, a variety of mechanisms such as a drag mechanism including a plurality of drag plates and a sound producing mechanism for producing sounds during an operation of the drag mechanism are accommodated in the interior of the bobbin trunk. Japanese Laid-Open Patent Application No. 2004-81097 discloses such reel as an example.

This type of sound producing mechanism includes a plate-shaped member that is made of a synthetic resin and is mounted to the rear end portion of the bobbin trunk through a separate attachment base, and a disk-shaped member that is disposed to make contact with the plate-shaped member and accordingly produces sounds. The attachment base is a circular arc-shaped member that is formed to fit the inner periphery of the rear end portion of the bobbin trunk, and is fastened onto the rear end of the bobbin trunk by a screw. A spool shaft is engaged with the inner periphery of the disk-shaped member such that it is not allowed to rotate and move in a front-to-rear direction. Thus, the disk-shaped member functions as a spool receiving member for restricting the backward movement of the spool. In addition, a concave-convex portion is formed on the outer periphery of the disk-shaped member. The disk-shaped member is configured to makes contact with the concave-convex portion when the disk-shaped member and the plate-shaped member relatively rotate, and thus produces sounds.

DISCLOSURE OF THE INVENTION

Problems the Invention is to Solve

As described above, the plate-shaped member is attached to the rear end portion of the bobbin trunk through the attachment base in the conventional spool with the sound producing mechanism. However, the rear end portion of the bobbin trunk is generally formed thinly in a spool that a bobbin trunk and a skirt portion are integrally formed by a metal thin plate. Therefore, it is difficult to mount and fix an attachment base for attaching the plate-shaped member. Furthermore, the attachment base for attaching the plate-shaped member is attached to protrude backward from the rear end portion of the bobbin trunk. Accordingly, it is impossible to shorten the length of the spool shaft in an axial direction, and thus it is difficult to compactly dispose the spool.

In the above described conventional spool including the sound producing mechanism, the plate-shaped member is mounted to through the attachment base that is fixed to the rear end portion of the bobbin trunk by a screw member. Accordingly, when the attachment base is attached in producing the spool, the screw member is required to be mounted while the plate-shaped member is attached to the attachment base. Therefore, there is a possibility that it takes a lot of time and effort to assemble the sound producing mechanism.

An object of the present invention is to make it possible to easily attach a sound producing mechanism to a spool of a spinning reel and to compactly dispose the spool.

Another object of the present invention is to make it easier to assemble a sound producing mechanism in a spool of a spinning reel.

Means to Solve the Problems

A spool of a spinning reel in accordance with a first aspect of the present invention is a spool that is disposed in a reel unit so as to be movable in a front-to-rear direction and fishing line is wound around an outer periphery thereof, and includes a cylindrical bobbin trunk that fishing line is wound around an outer periphery thereof, a front flange portion protruding outward in a diameter direction from a front end portion of the bobbin trunk, a rear flange portion protruding outward in a diameter direction from a rear end portion of the bobbin trunk, a cylindrical skirt portion protruding backward in an axial direction from a front end portion of the rear flange portion, an attachment recess that is formed to be annularly concaved in an inner peripheral portion of the bobbin trunk such that a rear portion thereof is opened, and an annular attachment member that is detachably/reattachably fixed in the attachment recess and at least a portion of a sound producing mechanism, which produces sounds when the sound producing mechanism relatively rotates with a spool shaft non-rotatebly disposed in the reel unit, is attached thereto, and the bobbin trunk, the front flange portion, the rear flange portion, and the skirt portion are integrally formed by a metal member. The attachment member is a synthetic resin member.

In this spool, an annular attachment member to which at least a portion of the sound producing mechanism is attached is detachably/reattachably mounted and fixed in the mounting recess that is formed to be annularly concaved in the inner peripheral portion of the bobbin trunk. Here, the annular attachment member is mounted in the attachment recess that is formed to be annularly concaved. Accordingly, it is possible to easily attach the attachment member to the attachment recess, and it is also possible to uniformly maintain the weight balance of the spool in a peripheral direction. In this case, the attachment member is also mounted in the attachment recess, and thus the attachment member is not likely to protrude backward from the rear end portion of the bobbin trunk. Accordingly, it is possible to compactly dispose the spool. In this case, it is not necessary to attach the attachment member to the rear end portion of the bobbin trunk or that of the rear flange portion. Therefore, it is possible to thinly form the thickness of the bobbin trunk or the rear flange portion. In this case, it is possible to easily form the bobbin trunk, the front flange portion, the rear flange portion, and the skirt portion by means of integral molding such as forging or press working, and it is also possible to reduce the entire weight of the spool with the synthetic resin attachment member.

A spool in accordance with a second aspect of the present invention is the spool according to the first aspects of the present invention, and further includes an inner flange portion that protrudes inward in a diameter direction from an inner peripheral portion of the bobbin trunk and a rear surface thereof corresponds to a bottom surface of the attachment recess, a mounting recess that is formed to be annularly concaved in the inner peripheral portion of the bobbin trunk such that a front portion thereof is opened and a bottom surface thereof corresponds to a front surface of the inner flange portion, an annular mounting member that is detachably/reattachably mounted and fixed in the mounting recess, and a coupling member that couples the attachment member and the mounting member while the inner flange portion is disposed/supported between/by the attachment member and the mounting member. In this case, it is possible to thinly form the thickness of the inner flange portion, compared to a case that a screw hole is formed in the inner flange portion, for instance. Accordingly, it is possible to further reduce the entire weight of the spool.

A spool in accordance with a third aspect of the present invention is the spool according to one of the first to second aspects of the present invention in which the coupling member is a screw member that is inserted either from a rear end portion of the attachment member or from a front end portion of the mounting member. The inner flange portion and one of the attachment member and the mounting member include a through hole into which the screw member is inserted, respectively. The other of the attachment member and the mounting member includes a threaded hole that is communicated with the through hole and the screw member is screwed thereinto. In this case, it is possible to couple the attachment member and the mounting member with a simple configuration.

A spool in accordance with a fourth aspect of the present invention is the spool according to one of the first to third aspects of the present invention in which the attachment member is attached such that a rear end surface thereof is disposed in the inner peripheral portion of the bobbin trunk. In this case, the attachment member is completely mounted in the attachment recess, and thus the attachment member is not likely to protrude backward from the rear end portion of the bobbin trunk. Accordingly, it is possible to further compactly dispose the spool.

A spool in accordance with a seventh aspect of the present invention is the spool according to one of the first to fourth aspects of the present invention in which the sound producing mechanism includes a sound producing member that is non-rotatably mounted to the spool shaft and a concave-convex portion for producing sounds on an outer peripheral surface thereof, a hitting member that a base end portion thereof is fixed to the attachment member and a front end portion thereof repeatedly makes contact with the concave-convex portion and produces sounds when the spool rotates, and an urging member that urges the hitting member toward the sound producing member. In this case, it is possible to reliably produce sounds with a relatively simple configuration, and it is also possible to produce clear crisp sounds.

A spool in accordance with an sixth aspect of the present invention is the spool according to the fifth aspect of the present invention in which the hitting member is attached such that a base end portion thereof is disposed in the inner peripheral portion of the bobbin trunk. In this case, the base end portion of the hitting member is disposed in the inner peripheral portion of the bobbin trunk, and thus the hitting member itself is not likely to protrude backward from the rear end portion of the bobbin trunk. Accordingly, it is possible to further compactly dispose the spool.

A spool in accordance with a seventh aspect of the present invention is the spool according to one of the first to sixth aspects of the present invention, and further includes mechanism relatively rotates with a spool shaft non-rotatably fixed to the reel unit; n interlocked portion that is formed in a rear portion of an inner peripheral side of the bobbin trunk; and an interlocking portion that is elastically interlocked with the interlocked portion and fixes the attachment member to the bobbin trunk. The attachment member being detachably/reattachably mounted and fixed from the backward of the bobbin trunk. Here, the sound producing mechanism produces sounds when the sound producing mechanism relatively rotates with a spool shaft non-rotatably fixed to the reel unit. The interlocked portion is formed in a rear portion of an inner peripheral side of the bobbin trunk. The interlocking portion is elastically interlocked with the interlocked portion and fixes the attachment member to the bobbin trunk.

A spool in accordance with a eighth aspect of the present invention is the spool according to the first aspect of the present invention, and further includes an attachment recess that is formed to be dented in an inner peripheral portion of the bobbin trunk such that a rear portion thereof is opened and the attachment member is detachably/reattachably fixed from backward thereto, an inner flange portion that protrudes inward in a diameter direction from an inner peripheral portion of the bobbin trunk and a rear surface thereof corresponds to a bottom surface of the attachment recess, and a tubular flange portion that protrudes backward from the rear surface of the inner flange portion and an outer surface thereof corresponds to a lateral surface of the attachment recess. In this case, the attachment member is mounted in the attachment recess, and thus the attachment member is not likely to protrude backward from the rear end portion of the bobbin trunk. Accordingly, it is possible to compactly dispose the spool.

A spool in accordance with a ninth aspect of the present invention is the spool according to the eighth aspect of the present invention in which the interlocked portion is an annular groove that is formed in an outer peripheral side of the tubular flange portion so as to be arranged along a peripheral direction. The interlocking portion is an elastic O-ring that is separately provided in a rear end portion of the attachment member, and presses and fixes the attachment member to the inner flange portion, and an inner peripheral portion thereof is mounted to the annular groove. In this case, the elastic O-ring is mounted to the annular groove and the attachment member is elastically interlocked with the bobbin trunk. Accordingly, it is possible to easily perform attachment/detachment of the sound producing mechanism.

A spool in accordance with a tenth aspect of the present invention is the pool according to the eighth aspect of the present invention in which the interlocked portion is a first interlocking groove that is formed in an inner peripheral side of the bobbin trunk. The interlocking portion is a first interlocking piece that is integrally formed in an outer peripheral side of a front end portion of the attachment member and is elastically interlocked with the first interlocked groove. In this case, the first interlocking piece of the attachment member is interlocked with the first interlocking groove in an inner peripheral side of the bobbin trunk. Accordingly, it is possible to easily perform attachment/detachment of the sound producing mechanism.

A spool in accordance with a eleventh aspect of the present invention is the pool according to the eighth aspect of the present invention in which the interlocked portion is a second interlocking groove that is formed in an outer peripheral side of the tubular flange portion. The interlocking portion is a second interlocking piece that is integrally formed in an inner peripheral side of a front end portion of the attachment member and is elastically interlocked with the second interlocking groove. In this case, the second interlocking piece of the attachment member is interlocked with the second interlocking groove in the outer peripheral side of the tubular flange portion, and thus the attachment member is elastically interlocked with the bobbin trunk. Therefore, it is possible to easily perform attachment/detachment of the sound producing mechanism.

A spool in accordance with an twelfth aspect of the present invention is the spool according to one of the seventh to eleventh aspects of the present invention in which the attachment member is positioned and fixed in an inner peripheral portion of the bobbin trunk by interlocking a plurality of positioning protrusions that are formed in an opposed side to the bobbin trunk with a plurality of positioning grooves that are formed in the inner peripheral portion of the bobbin trunk with phase shifting in a peripheral direction. In this case, it is possible to position the attachment member with respect to the bobbin trunk and prevent the attachment member from rotating with respect to the bobbin trunk with a simple configuration.

EFFECTS OF THE INVENTION

According to the present invention, in a spool of a spinning reel, an annular attachment member to which a sound producing mechanism is attached is detachably/reattachably mounted and fixed in an attachment recess that is formed to be annularly concaved in an inner peripheral portion of a bobbin trunk. Therefore, it is possible to easily attach the attachment member to the attachment recess, and it is also possible to compactly dispose the spool.

According to the present invention, in the spool of a spinning reel, the attachment member to which the sound producing mechanism is attached is detachably/reattachably mounted and fixed from the backward of the bobbin trunk. In addition, the interlocked portion is formed in the rear portion of the inner peripheral side of the bobbin trunk, and the interlocking portion is elastically interlocked with the interlocked portion. Thus, the attachment member is fixed to the bobbin trunk. Therefore, it is possible to easily perform attachment/detachment of the sound producing mechanism.

BRIEF DESCRIPTION OF THE DRAWINGS

Referring now to the attached drawings which form a part of this original disclosure.

BEST MODE OF CARRYING OUT THE INVENTION

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
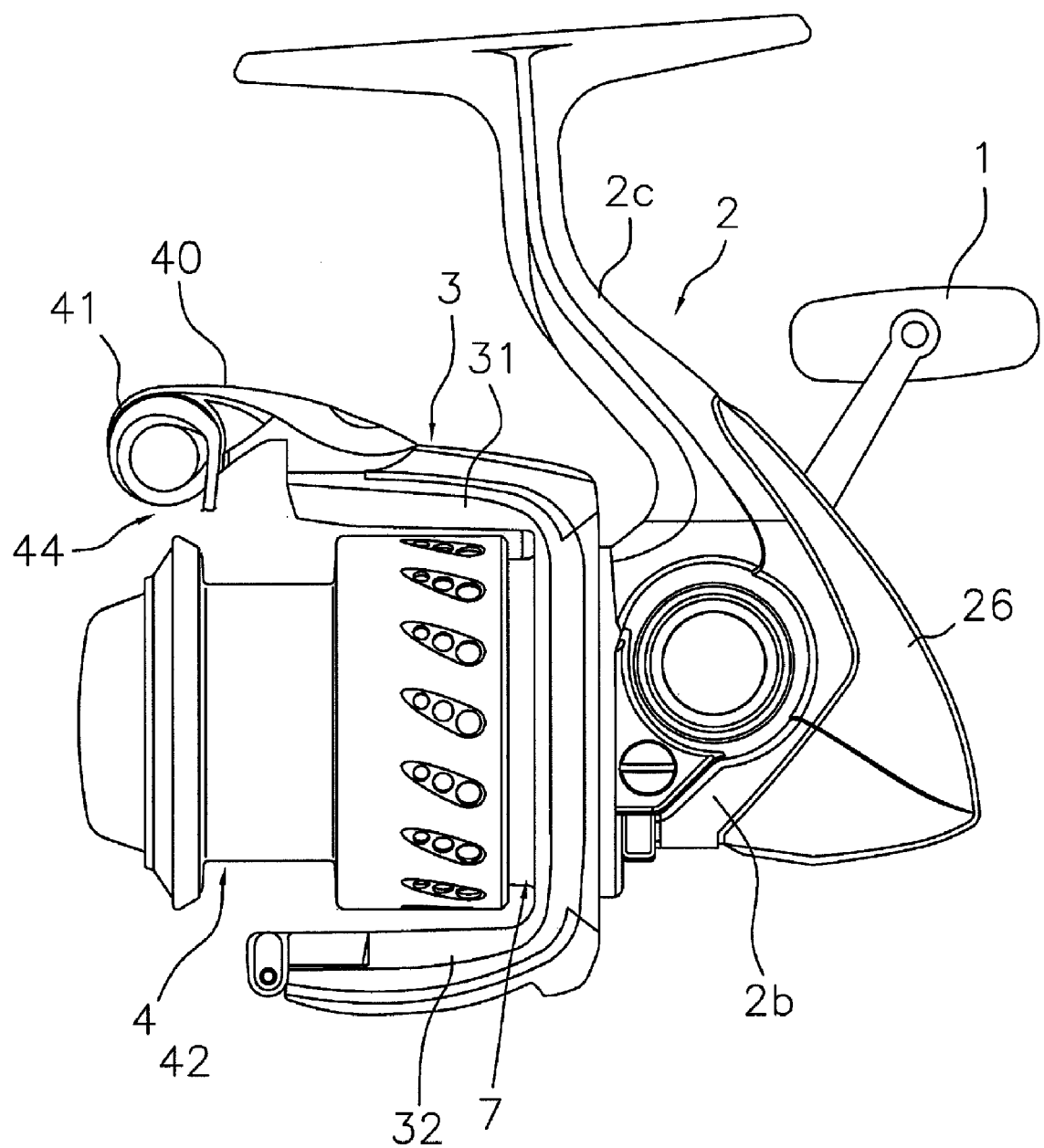
FIG. 1 is a lateral view of a spinning reel according to an embodiment of the present invention.

As illustrated in FIG. 1, a spinning reel in accordance with an embodiment of the present invention includes a handle 1, a reel unit 2 that rotatably supports the handle 1, a rotor 3, and a spool 4, The rotor 3 is rotatably supported on the front portion of the reel unit 2. The spool 4 serves to wind fishing line around its outer peripheral surface, and is disposed on the front portion of the rotor 3 so as to be allowed to move in a front-to-rear direction. Note that the handle 1 is capable of being mounted to either the left side or the right side of the reel unit 2.

Figure 2:
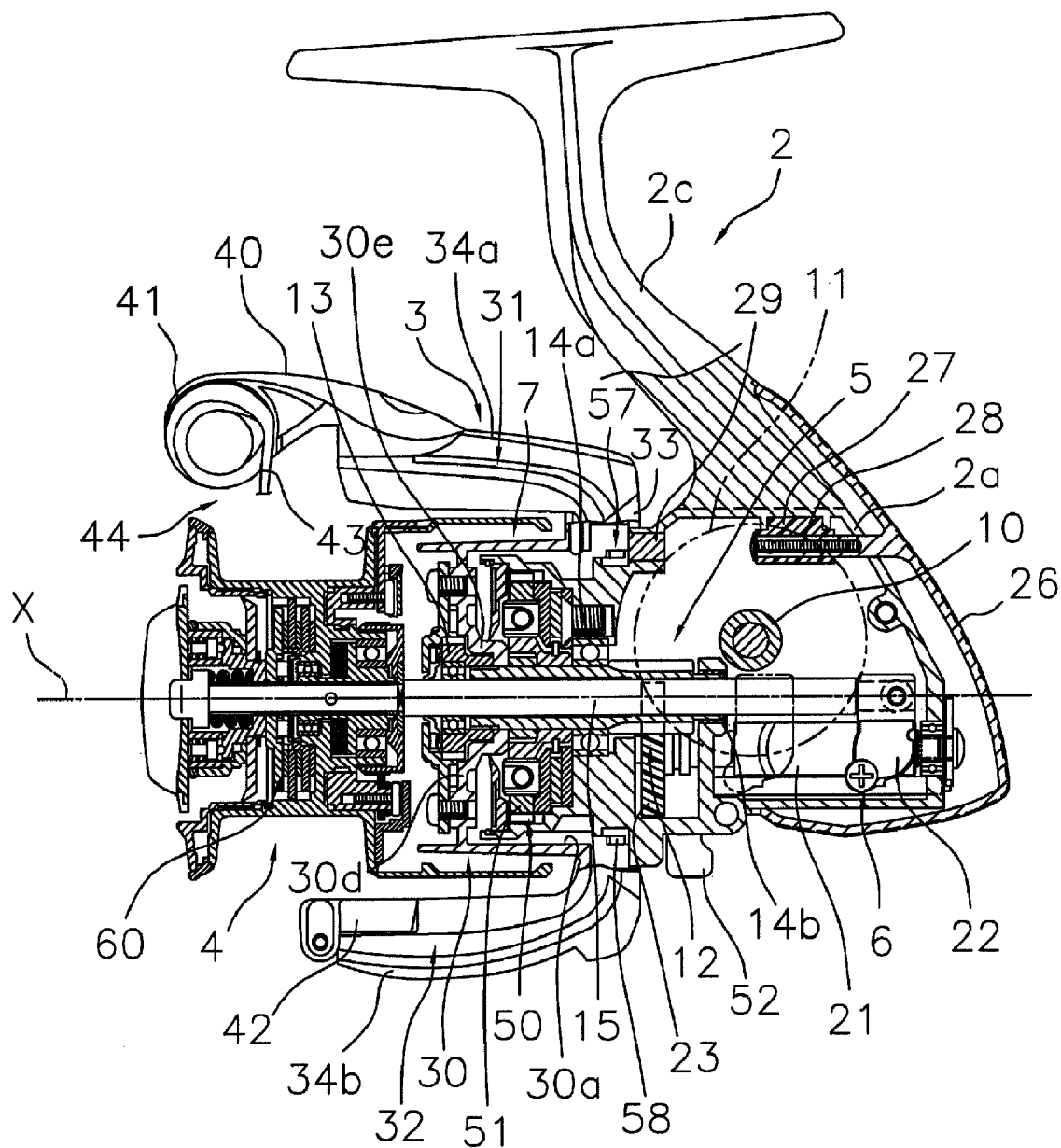
FIG. 2 is a lateral cross-sectional view of the spinning reel.
Figure 3:
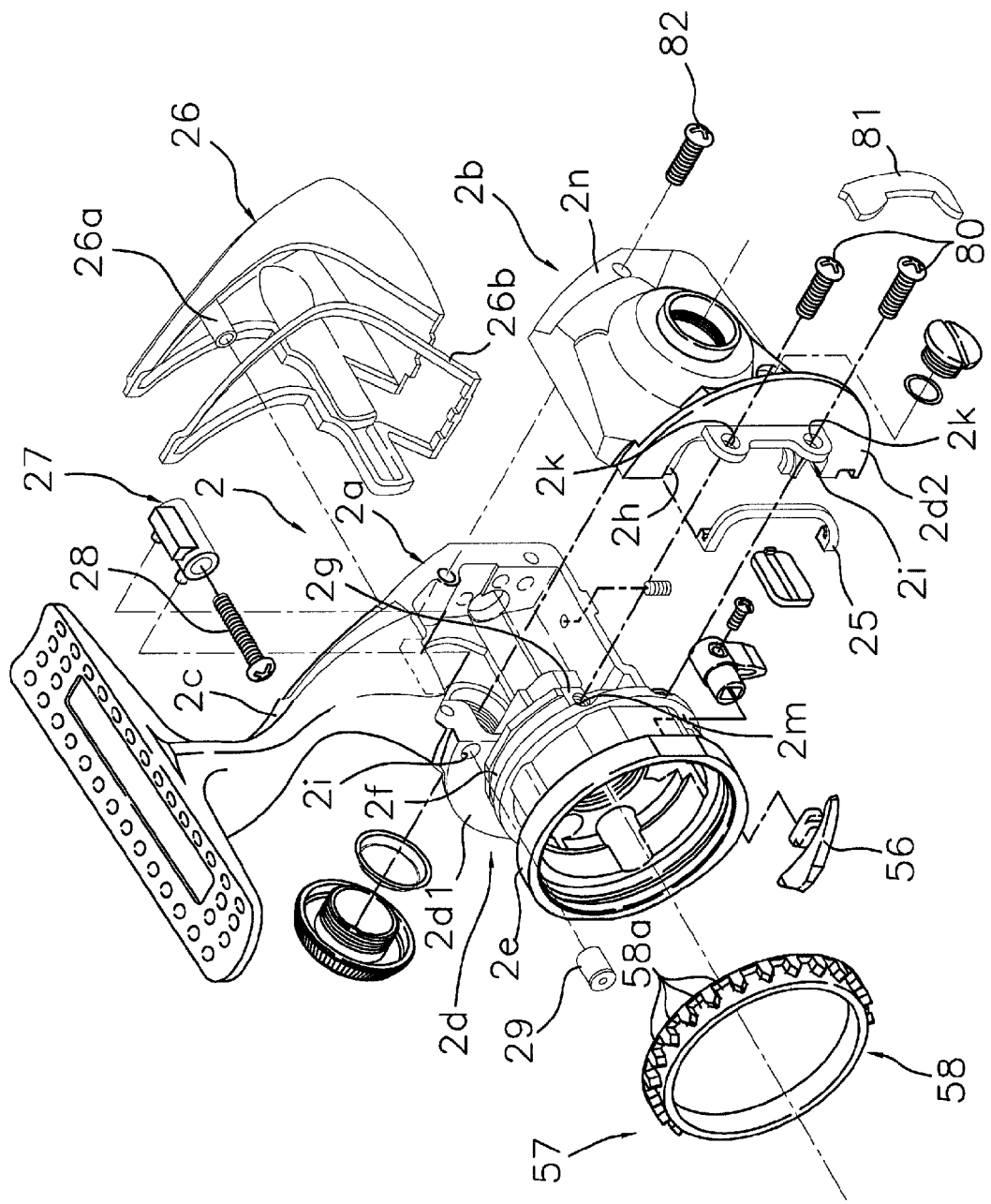
FIG. 3 is an exploded perspective view of the spinning reel.

As illustrated in FIGS. 2 and 3, the reel unit 2 includes a reel body 2a having a space in its interior, and a lid member 2b (see FIG. 3) detachably/reattachably mounted to the reel body 2a so as to enclose the space formed in the interior of the reel body 2a. The reel unit 2 also includes a reel unit protection member 26 that covers the rear portion of the reel body 2a and that of the lid member 2b.

The reel body 2a is made of a light alloy such as a magnesium alloy and an aluminum alloy, and is formed integrally with a T-shaped rod attachment leg 2c that is formed on the top of the reel body 2a to extend in a front-to-rear direction. As illustrated in FIG. 2, the inner space of the reel body 2a accommodates a rotor driving mechanism 5 and an oscillation mechanism 6. As illustrated FIG. 3, a first flange portion 2d1 and a cylindrical portion 2e are formed on the front end of the reel body 2a. The first flange portion 2d1 is formed in a substantially semicircular shape and makes up a part of a circular flange 2d. The cylindrical portion 2e is open to the front and the diameter thereof is smaller than that of the flange 2d. A tool insertion hole 2j is formed in the upper portion of the first flange portion 2d1. Here, a tip of a tool, such as a driver for fastening a fixing bolt 28 to fix the reel unit protection member 26, is allowed to be inserted into the tool insertion hole 2j. The tool insertion hole 2j is capped by a cap 29 after the reel unit protection member 26 is attached by means of the fixing bolt 28. A mounting groove 2f is formed in the base end portion of the cylindrical portion 2e on the flange 2d side, and the cross-section thereof is cut out in a circular shape. In addition, as illustrated in FIG. 3, a braking member 58 of a rotor braking mechanism 57 is mounted in the mounting groove 2f.

The lid member 2b is made of a light metal such as a magnesium alloy and an aluminum alloy. The lid member 2b is fixed to the reel body 2a by means of two fixing bolts 80 and one fixing bolt 82. The fixing bolts 80 is fixed at two spots of the front side of the lid member 2b, which is covered with the rotor 3, and the fixing bolt 82 is fixed at a spot of the rear side of the lid member 2b to be disposed away from the rotor 3.

Note that the fixing bolt 82 fixes the lid member 2b to the reel body 2a at a position where the fixing bolt 82 is covered with the reel unit protection member 26.

A second flange portion 2d2 is formed on the front end of the lid member 2b. The second flange portion 2d2 is formed in an approximately semi-circular shape, and forms a circular flange 2d together with a first flange portion 2d1. A plate-shaped portion 2i through which the fixing bolts 80 pass is integrally formed on the front surface of the second flange portion 2d2. The plate-shaped portion 2i is provided to fix the lid member 2b to the reel body 2a by means of the fixing bolt 80. The plate-shaped potion 2i is formed to protrude frontward from the outside of an approximately C-shaped seal mounting portion 2h to which a seal member 25 is mounted. The plate-shaped portion 2i is a vertically long portion, and a pair of through holes 2k through which the fixing bolts 80 pass are formed on the both ends thereof. In the plate-shaped portion 2i, an area formed between the through holes 2k is configured to have smaller amount of protrusion than areas in which the through holes 2k are formed. In other words, the plate-shaped portion 2i is formed such that the both ends thereof are formed to protrude in a substantially semi-circular shape with the same thickness and the area formed between the both ends is formed to protrude from the second flange portion 2d2 to be slightly dented backward compared to the center of the through holes 2k.

The seal member 25 is a C-shaped member made of a synthetic resin, and is provided to seal a portion dividing the flange into the lid member 2b and the reel body 2a. A switching member 56 to be described is detachably/reattachably mounted to the portion dividing the reel body 2a and the lid member 2b.

A recess 2g is formed in a portion of the cylindrical portion 2e on which the mounting groove 2f is formed, and the plate-shaped portion 2i is disposed in the recess 2g. A projection member 81 is mounted to the recess 2g so as to prevent the braking member 58 from being dented. The recess 2g is formed to be dented so as to fit the outline of the plate-shaped portion 2i. It is also formed to be dented in a substantially semicircular shape such that the both ends in a vertical direction protrude frontward compared to the intermediate portion between the both ends. The plate-shaped portion 2i is fixed to the recess 2g of the reel body 2a by means of the two fixing bolts 80. Accordingly, threaded holes 2m into which the fixing bolts 80 are screwed are formed in the recess 2g to be disposed in a predetermined spaced relationship in the vertical direction.

As illustrated in FIG. 3, the reel unit protection member 26 is mounted to both the reel body 2a that includes the rod attachment leg 2c and a slanted portion 2n that is formed on the rear portion of the lid member 2b through a packing 26b for suitably fitting these members. The reel unit protection member 26 is fixed to the reel body 2a by means of the fixing bolt 28. The reel unit protection member 26 includes a rod-shaped boss 26a into which the fixing bolt 28 is screwed. The tip of the boss 26a protrudes to pass through the rear portion of the reel body 2a and face a collar member 27 to be described in a slightly spaced relationship.

Note that as illustrate in FIG. 3, the fixing bolt 28 passes through the interior of the collar member 27 and is screwed into the boss 26a of the reel unit protection member 26. Thus, it fixes the reel unit protection member 26 to the reel body 2a. The collar member 27 is a tubular member and is interlocked with the reel body 2a while it is aligned in a front-to-rear direction and a left-to-right direction. The fixing bolt 28 is mounted to the reel body 2a while the screw portion thereof is preliminarily disposed in the collar member 27 before assembly. Then, after the lid member 2b is fixed, the fixing bolt 28 is screwed in a tightened direction by a tool such as a driver that is inserted into the interior of the reel unit 2 through the tool insertion hole 2j. Thus, the fixing bolt 28 fixes the reel unit protection member 26 to the reel body 2a through the collar member 27.

According to the reel unit 2, the fixing bolt 82 for fixing the lid member 2b to the reel body 2a is covered with the reel unit protection member 26, and the fixing bolts 80 is covered with the rotor 3. Therefore, such bolt members are invisible from the outside. In addition, the fixing bolt 28 for attaching the reel unit protection member 26 is also covered with the cap 29. Therefore, it is possible to form the reel unit in a simple appearance without exposing bolt members to the outside.

As illustrated in FIG. 2, the rotor driving mechanism 5 includes a face gear 11 that rotates together with a master gear shaft 10 to which the handle 1 is fixed, and a pinion gear 12 that meshes with the face gear 11. The pinion gear 12 is formed in a tubular shape, and the front portion thereof passes through the center portion of the rotor 3 and is fixed to the rotor 3 by a nut 13. In addition, the intermediate portion and the rear end portion of the pinion gear 12 in its axial direction are rotatably supported by the reel unit 2 through bearings 14a and 14b, respectively.

An oscillating mechanism 6 is a mechanism for moving a spool 4 in a front-to-rear direction by moving a spool shaft 15 coupled to the center of the spool 4 via a drag mechanism 60 in the front-to-rear direction. The oscillating mechanism 6 includes a worm shaft 21 disposed below the spool shaft 15 to be parallel to the spool shaft 15, a slider 22 that moves along the warm shaft 21 in a front-to-rear direction, and an intermediate gear 23 that is fixed to the tip of the worm shaft 21. The rear end of the spool shaft 15 is non-rotatably fixed to the slider 22. The intermediate gear 23 meshes with the pinion gear 12.

As illustrated in FIG. 2, the rotor 3 includes a rotor body 7 that is disposed in the reel unit 2 so as to be capable of rotating around a first axis X in a front-to-rear direction, a first cover member 33 that covers the rear portion of the rotor body 7, and a pair of second cover members 34a and 34b that cover the outer surface of first and second rotor arms 31 and 32.

The rotor body 7 is made of an aluminum alloy, for instance. The rotor body 7 is non-rotatably coupled to the pinion gear 12, but it is rotatably supported by the reel unit 2. The rotor body 7 includes a tubular member 30, the first and second rotor arms 31 and 32, and a pair of tubular bosses 30b and 30c. Here, the tubular member 30a includes a hollow portion 30a in its rear portion so as to accommodate the cylindrical portion 2e, which is a front portion of the reel unit 2, in the interior of the hollow portion 30a. The first and second rotor arms 31 and 32 are connected to opposed positions in the rear portion of the tubular member 30 and extend forward from the connection positions while they are spaced apart from the tubular member 30. The bosses 30b and 30c are formed in opposed positions outside the hollow portion 30a in its diameter direction and protrude backward from the positions. In addition, as illustrated in FIG. 2, the rotor 3 further includes brackets 34c and 34d, and fixing bolts 35a and 35b. Here, the brackets 34c and 34d are interlocked with a pair of bosses 30b and 30c such that they are allowed to move in a protruding direction of the bosses 30b and 30c (i.e., front-to-rear direction) but not to move in a perpendicular direction to the protruding direction (i.e., diameter direction of the rotor 3). The fixing bolts 35a and 35b are used to fix the first cover member 33 to the rotor body 7. The brackets 34c and 34d are provided in the pair of second cover members 34a and 34b, and are formed to extend toward the first and second rotor arms 31 and 32. The fixing bolts 35a and 35b couples the first cover member 33 to the rotor body 7 while the brackets 34c and 34d are interlocked with the pair of bosses 30b and 30c.

The tubular member 30 includes a disk-shaped wall portion 30d in an inner peripheral side of its front portion, and an annular boss 30e is formed in the center of the wall portion 30d. Here, the boss 30e is coupled to the pinion gear 12 so as to be allowed to integrally rotate with it. The front portion of the pinion gear 12 is non-rotatably interlocked with the center of the boss 30e, and the rotor body 7 is fixed to the pinion gear 12 by fastening a nut 13 into the tip of the pinion gear 12.

The first cover member 33 is configured to cover the rear portion of the rotor body 7 around the hollow portion 30a. Through holes 33a and 33b through which the fixing bolts 35a and 35b pass are formed in the first cover member 33 so as to be opposed to the bosses 30b and 30c. The fixing bolts 35a and 35b are disposed along an axial direction parallel to the first axis X. Therefore, the through holes 33a and 33b are also formed to be arranged in the same direction. The through holes 33a and 33b include stepped portions 33c and 33d, respectively, in which head portions of the fixing bolts 35a and 35b are respectively accommodated. Accordingly, the head portions of the fixing bolts 35a and 35b do not protrude backward. In addition, a circular opening 33e is formed in the first cover member 33 so as to be separated apart from the flange 2d of the reel unit 2 through a slight gap of approximately 0.5 to 1.5 mm.

The second cover member 34a covers the outside of the first rotor arm 31, and is coupled to the first rotor arm 31 by fastening a fixing bolt 36 into the first rotor arm 31. The second cover member 34a is joined to the first cover member 33 and the first rotor arm 31 and thus these members form a three-dimensionally curved shape. Because of this configuration, even if the second cover member 34a is slightly misaligned in a forward or backward direction, a step may be formed between the second cover member 34a and the first rotor arm 31 and between the second cover member 34a and the first cover member 33. The bracket 34c provided in the second cover member 34a is an approximately rectangular plate-shaped member, and its base end side is reinforced by a plurality of ribs 34e. A through hole 34g is formed in the front end side of the bracket 34c, and the boss 30b passes through and is engaged with the through hole 34g. Because of the configuration, the bracket 34c is interlocked with the boss 30b such that it is allowed to move in a protrusion direction of the boss 30b (i.e., front-to-rear direction) but not to move in a perpendicular direction to the protrusion direction (i.e., diameter direction of the rotor 3). The front end portion of the second cover member 34a is cut out in an approximately semicircular shape such that a first bail support member 40 to be described is allowed to be disposed therein.

The second cover member 34b covers the outside of the second rotor arm 32, and is fixed to the second rotor arm 32 by the fixing bolt 37 and a nut member 38 that is screwed onto the fixing bolt 37. The second cover member 34b is joined to the first cover member 33 and the second rotor arm 32 and thus these members also form a three-dimensionally curved shape. Because of the configuration, even if the second cover member 34b is slightly misaligned in a forward or backward direction, a step may be formed between the second cover member 34b and the second rotor arm 32 and between the second cover member 34b and the first cover member 33. The bracket 34d provided in the second cover member 34b is approximately the same as the bracket 34c that is formed in an approximately rectangular plate shape, and its base end side is reinforced by a plurality of ribs 34f. A through hole 34h is formed in the front end side of the bracket 34d, and the boss 30c passes through and is engaged with the through hole 34h. Because of the configuration, as well as the bracket 34c, the bracket 34d is interlocked with the boss 30c so as to be allowed to move in a protrusion direction of the boss 30c (i.e., front-to-rear direction) but not to move in a perpendicular direction to the protrusion direction (i.e., diameter direction of the rotor 3). An interlocking hole 34i is formed in the tip of the second cover member 34b so as to non-rotatably interlock the nut member 38 that is screwed onto the fixing bolt 37. The fixing bolt 37 fixes the second cover member 34b to the rotor body 7, and also has a function of supporting a second bail support member 42 to be described such that the second bail support member 42 is allowed to swing.

Here, the bosses 30b and 30c pass through the brackets 34c and 34d, and the second cover member 34a and 34b are allowed to move in a front-to-rear direction but are restricted to move only in the diameter direction. Therefore, when members including the first cover member 33 are fixed to the rotor body 7, it is possible to reduce a step that may be formed among cover members 33, 34a and 34b and a step that may be formed among the rotor body 7 and the cover members 33, 34a and 34b to a maximum extent without increasing processing accuracy.

Specifically, when the rotor 3 is assembled while a bail flipping mechanism 53 and the like are accommodated therein, the bosses 30b and 30c are inserted into the through holes 34g and 34h formed in the brackets 34c and 34d, and the brackets 34c and 34d are interlocked with the bosses 30b and 30c. While this state is maintained, the second cover members 34a and 34b are mounted to the rotor body 7, and then the first cover member 33 is mounted to the rotor body 7 from its back side. Next, the second cover members 34a and 34b are fixed to the suitable positions in the rotor body 7 by the fixing bolts 36 and 37, which is performed by moving the second cover members 34a and 34b in a front-to-rear direction such that steps between the rotor body 7 and the second cover members 34a and 34b are reduced to a maximum extent. Then, the first cover member 33 is fixed to the rotor body 7 by inserting the fixing bolts 35a and 35b into the through holes 33a and 33b and then fastening them into the bosses 30b and 30c. Here, when steps are formed between the rotor body 7 and the second cover members 34a and 34b, it is possible to adjust the positions of the second cover member 34a and 34b in a front-to-rear direction by slightly loosening the fixing bolts 36 and 37.

The first bail support member 40 is mounted to the outer peripheral side of the tip of the first rotor arm 31 so as to be allowed to swing. A line roller 41 for guiding fishing line to the spool 4 is mounted to the tip of the first bail support member 40. In addition, the second bail support member 42 is mounted to an inner peripheral side of the tip of the second rotor arm 32 so as to be allowed to swing.

A bail 43 is a wire member that is bent into an approximately U-shape, and is fixed between the line roller 41 and the second bail support member 42. A bail arm 44 that guides fishing line onto the spool 4 is composed of the first bail support member 40, the second bail support member 42, the line roller 41 and the bail 43. The bail arm 44 is allowed to swing between a line-guiding posture illustrated in FIG. 2 and a line-releasing posture that flips from the line-guiding posture.

As illustrated in FIG. 2, an anti-reverse rotation mechanism 50 for prohibiting and allowing reverse rotation of the rotor 3 is disposed in the interior of the tubular member 30 of the rotor 3. The anti-reverse rotation mechanism 50 includes a roller-type one-way clutch 51 with a freely rotating inner ring, and a switching mechanism 52 that switches the one-way clutch 51 between an operating state (i.e., state in which reverse rotation is prohibited) and a non-operating state (i.e., state in which reverse rotation is allowed).

The bail flipping mechanism 53 is accommodated in the interior of the second cover member 34b, and restores the bail arm 44 from the line-releasing posture to the line-winding posture in association with the rotation of the handle 1 in the line-winding direction. The bail flipping mechanism 53 includes a toggle spring mechanism 54, a moving member 55, and the switching member 56. Here, the toggle spring mechanism 54 urges the bail arm 44 to the-line-releasing posture or the line-winding posture when the dead point as the switching timing is exceeded. The moving member 55 moves in a front-to-end direction in association with swing of the bail arm 44. The front ends of the toggle spring mechanism 54 and the moving member 55 are interlocked with the lower surface of the first bail support member 40. When the rotor 3 rotates in the line-winding direction, the rear end of the moving member 55 makes contact with and moves onto the switching member 56, and then moves forward. Accordingly, the bail arm 44 is restored to the line-winding posture. In addition, the moving member 55 also forms a part of the rotor braking mechanism 57. In the line-releasing posture, the moving member 55 engages with the braking member 58, and thus brakes the rotor 3 not to rotate. As illustrated in FIG. 3, the braking member 58 is an annular elastic member on which a plurality of recesses 58a are formed at a predetermined spacing in the peripheral direction, and frictionally engages with the mounting groove 2f. Here, the recesses 58a engage with the front end of the moving member 55.

Figure 4:
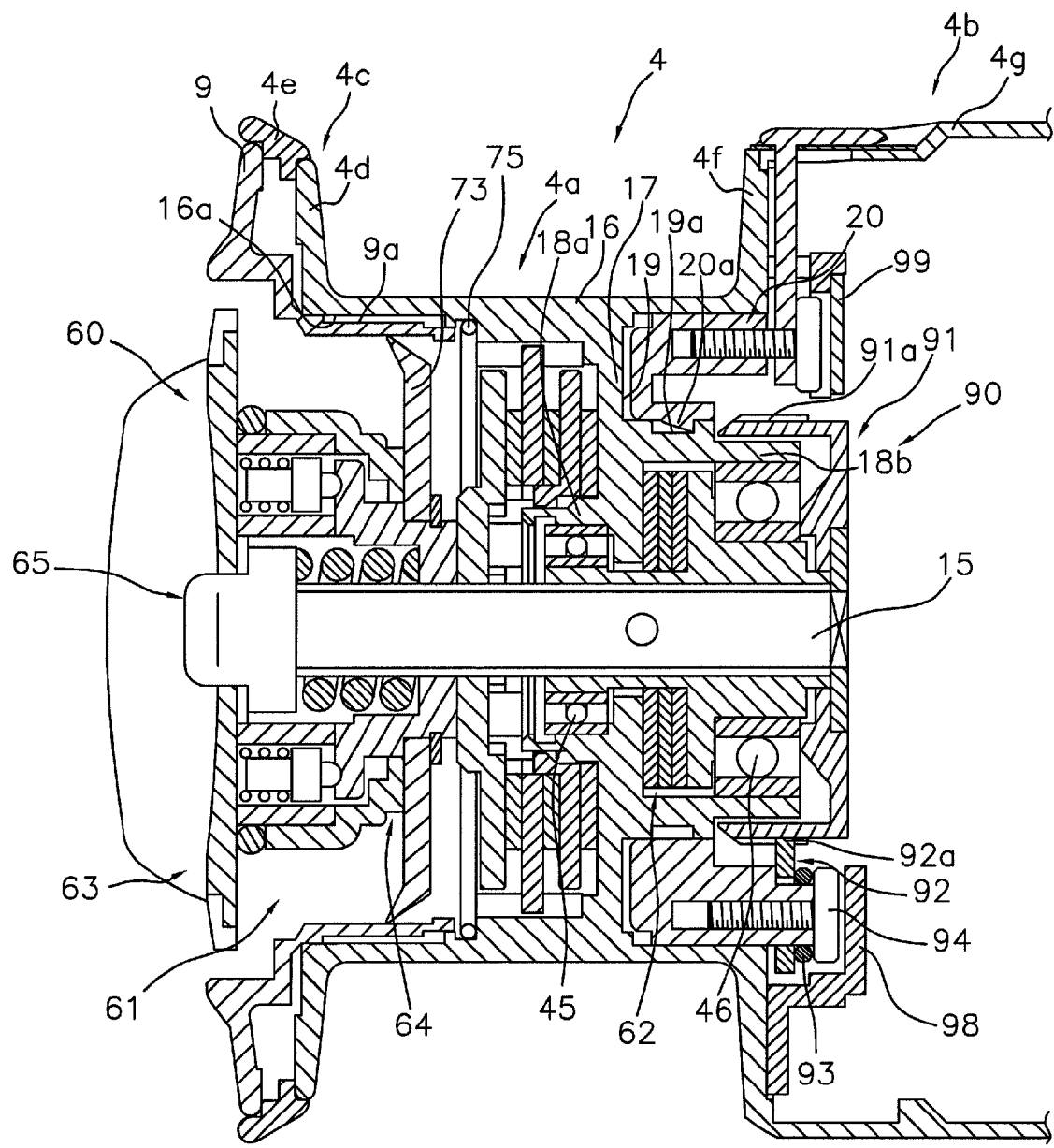
FIG. 4 is an enlarged cross-sectional view of the spinning reel.

As illustrated in FIG. 2, the spool 4 is disposed between the first rotor arm 31 and the second rotor arm 32 of the rotor 3, and is mounted to the tip of the spool shaft 15 through the drag mechanism 60. As illustrated in FIG. 4, the spool 4 includes a bobbin trunk 4a, a tubular skirt portion 4b, and a large-diameter front flange portion 4c. Here, fishing line is wound around the outer periphery of the bobbin trunk 4a. The skirt portion 4b is integrally formed with the bobbin trunk 4a so as to be disposed in the rear side of the bobbin trunk 4a. The front flange portion 4c is disposed in the front end of the bobbin trunk 4a. The front flange portion 4c includes an inner flange portion 4d and an outer flange portion 4e. Here, the inner flange portion 4d is integrally formed with the bobbin trunk 4a and protrudes outward from the front end portion of the bobbin trunk 4a in a diameter direction. The outer flange portion 4e is a ring-shaped member made of toughened ceramic, for instance, and is detachably/reattachably mounted to the outer peripheral side of the inner flange portion 4d. The outer flange portion 4e is fixed to the inner flange portion 4d by a flange fixing member 9. The skirt portion 4b includes a rear flange portion 4f and a cylindrical tubular portion 4g. The rear flange portion 4f protrudes outward in a diameter direction from the rear end portion of the bobbin trunk 4a. The tubular portion 4g protrudes backward in an axial direction from the tip of the rear flange portion 4f outside in the diameter direction. As illustrated in FIG. 4, the bobbin trunk 4a, the skirt portion 4b, and the inner flange portion 4d forms a double-tiered cylindrical member including big and small tiers, and are integrally formed by means of press work of an aluminum alloy or a magnesium alloy, forging of an aluminum ally, or the like. The double-tired cylindrical member is rotatably mounted to the spool shaft 15 with first and second bearings 45 and 46.

Figure 5:
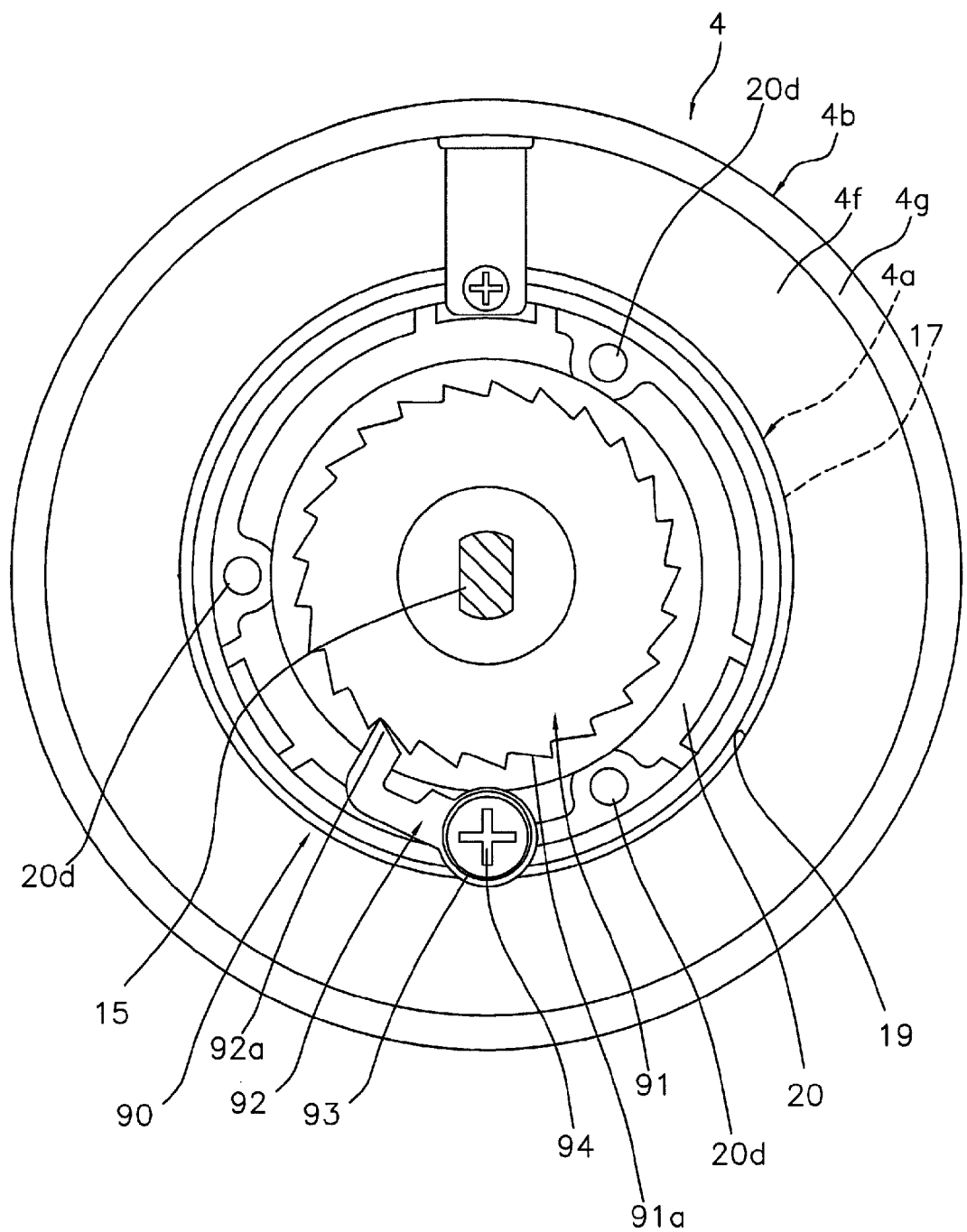
FIG. 5 is a rear cross-sectional view of the spool to which an attachment member is attached.
Figure 6:
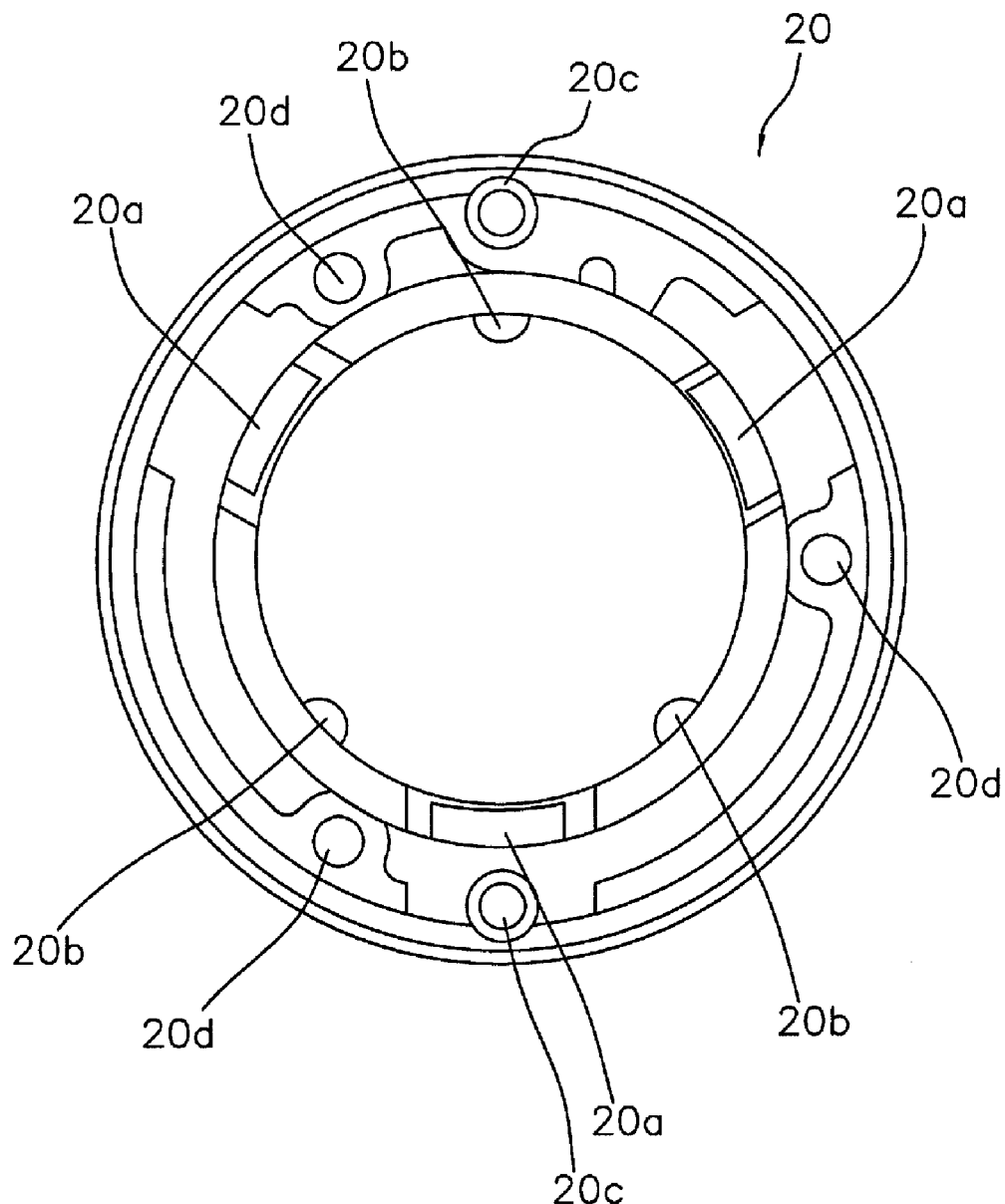
FIG. 6 is a front view of the attachment member.

As illustrated in FIGS. 4 and 5, the bobbin trunk 4a includes a cylindrical portion 16, a disk portion 17, support portions 18a and 18b, an annularly dented attachment recess 19, and an attachment member 20. Here, fishing line is wound around the outer periphery of the cylindrical portion 16. The disk portion 17 is formed in the inner peripheral side of the cylindrical portion 16 so as to have a step. The support portions 18a and 18b are closed-ended cylindrical members that are formed to protrude frontward and backward, respectively, on the inner peripheral side. The attachment recess 19 is formed to be annularly dented in the inner peripheral portion of the cylindrical portion 16 such that the rear portion thereof is opened. The attachment member 20 is an annular member to which a sound producing mechanism 90 is attached, and the sound producing mechanism 90 is detachably/reattachably mounted and fixed in the attachment recess 19 and produces sounds by means of its relative rotation to the spool shaft 15. A female threaded portion 16a is formed in the front portion of the cylindrical portion 16, and a male threaded portion 9a of a flange fixing member 9 is fastened into the female threaded portion 16a. The first and second bearings 45 and 46 are mounted in the inner side of the support portions 18a and 18b, respectively, and are also mounted to the spool shaft 15 through a tubular retaining member 47. The sound producing mechanism 90, which produces sounds when the spool 4 and the spool shaft 15 are relatively rotated, is disposed to backward of the bobbin trunk 4a.

Figure 8:
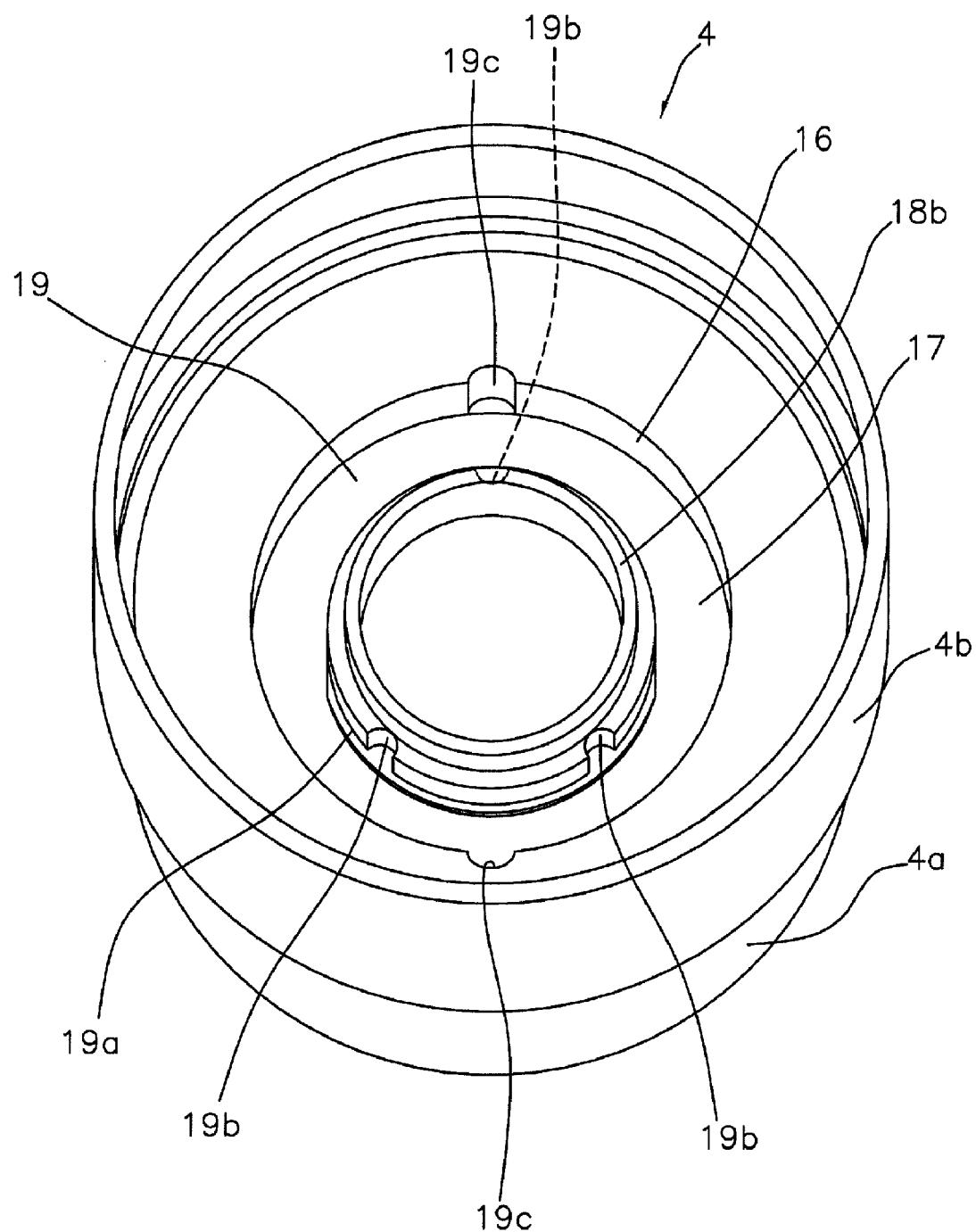
FIG. 8 is an enlarged rear perspective view of the spool.

As illustrated in FIGS. 4 and 8, the attachment recess 19 is an annular recess formed to be surrounded by a wall portion composed of the inner periphery of the rear portion of the cylindrical portion 16 and the outer peripheral surface of the support portion 18b and to include the rear surface of the disk portion 17 as the bottom portion thereof. Here, the disk portion 17 is an inner flange member that protrudes inward in a diameter direction from the inner peripheral portion of the bobbin trunk 4a and that its rear surface corresponds to the bottom portion of the attachment recess 19. The support portion 18b is a tubular flange portion that protrudes backward from the rear surface of the disk portion 17 and that its outer surface corresponds to a lateral surface of the attachment recess 19. The attachment recess 19 is formed to fit the separately provided annular attachment member 20 when the attachment member 20 is mounted to the attachment recess 19. In other words, the inner peripheral portion of the attachment recess 19 is formed in an annular shape so as to fit the outer peripheral portion of the attachment member 20. The attachment recess 19 is formed to be dented on the outer peripheral side of the support portion 18b to be arranged in the peripheral direction, and includes an interlocked portion 19a with which interlocking portions 20a are elastically interlocked. Here, the interlocking portions 20a are composed of three interlocking pieces that are integrally formed in three positions on the inner peripheral side of the front end portion of the attachment member 20. As illustrated in FIG. 4, the interlocked portion 19a is a groove portion that is formed to be dented on the remote side (i.e., front end side) of the outer peripheral side of the support portion 18b to be arranged in the peripheral direction, and the interlocking portions 20a are elastically interlocked with the interlocked portion 19a such that the front end portions of the interlocking portions 20a make contact with the inner peripheral surface on the near side (i.e., rear end side).

As illustrated in FIG. 8, the attachment recess 19 includes a plurality of interlocking hollows 19b that are circular arc-shaped cutout recesses. The interlocking hollows 19b are formed to be dented in the outer peripheral surface of the support portion 18 and are arranged to be unequally spaced in the peripheral direction. In addition, a plurality of interlocking protrusions 20b (see FIG. 9), which are formed to protrude from the inner peripheral surface of the front end of the attachment member 20 and are arranged to be unequally spaced in the peripheral direction, are engaged with the interlocking hollows 19b. When the interlocking protrusions 20b are engaged with the interlocking hollows 19b, it is possible to position the attachment member 20 with respect to the support portion 18a and also possible to prevent rotation of the attachment member 20 in the peripheral direction with respect to the support portion 18a. As illustrated in FIG. 8, the attachment recess 19 includes a plurality of interlocking hollows 19b that are circular arc-shaped cutout recesses. The interlocking hollows 19b are formed to be dented on the inner peripheral surface of the cylindrical portion 16 in the peripheral direction. In addition, bosses 20c (see FIG. 9), which are formed on the outer peripheral surface of the attachment member 20 at two positions in the peripheral direction such that a portion thereof protrudes outward in the diameter direction, are engaged with the engaging hollows 19c. Here, when the bosses 20c are engaged with the engaging hollows 19c, the large diameter bosses 20c protruding outward in the diameter direction are allowed to be relieved.

Figure 9:
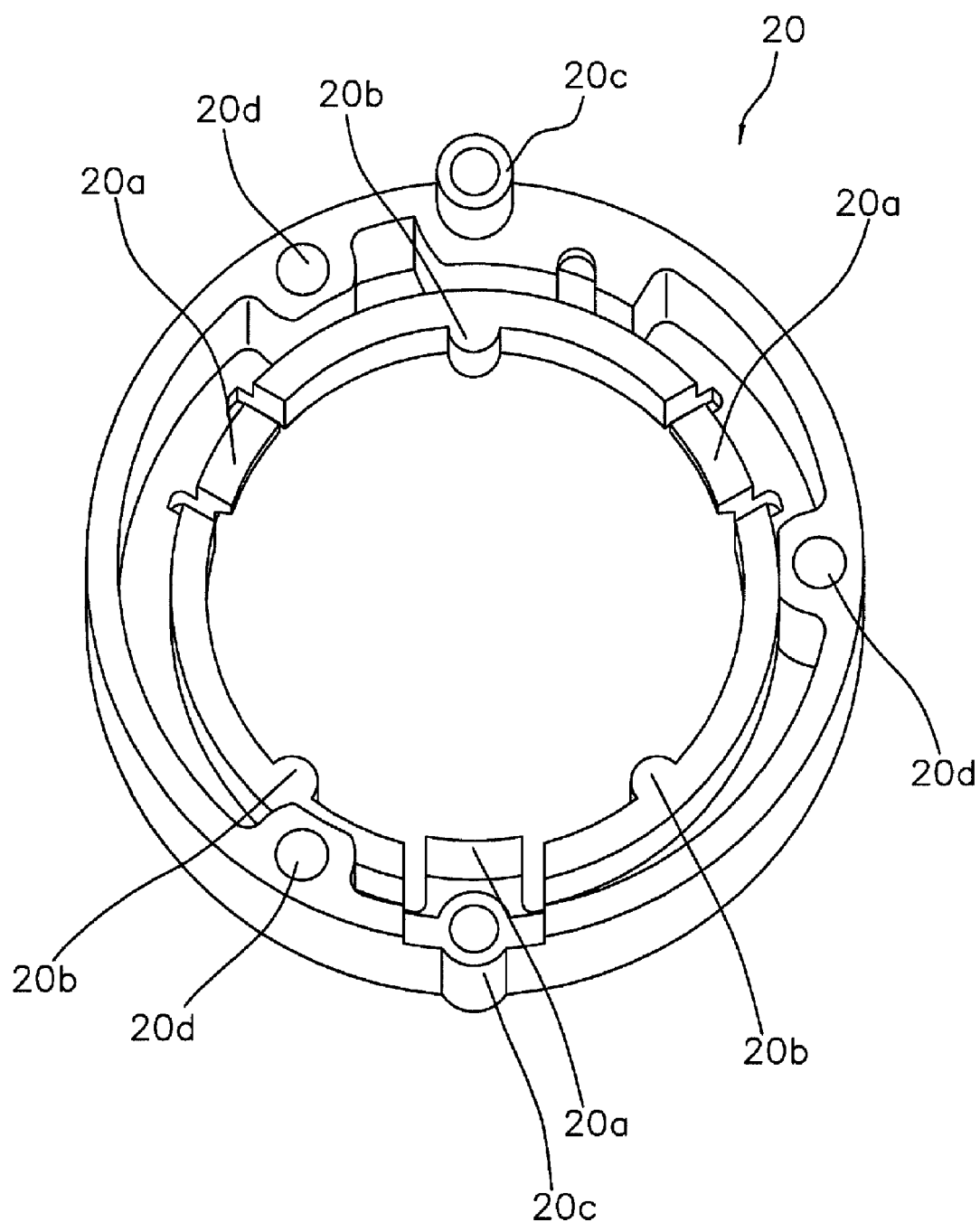
FIG. 9 is a front exploded perspective view of the attachment member.

As illustrated in FIGS. 4, 6, 7, 9 and 10, the attachment member 20 is an annular attachment base that is concentrically disposed with the spool shaft 15 so that an after-mentioned hitting member 92 of the sound producing mechanism 90, which produces sounds when it relatively rotates with the spool shaft 15, is mounted to the attachment member 20. The attachment member 20 is also an annular member that is made of synthetic resin. As illustrated in FIGS. 4 and 5, the attachment member 20 is mounted and fixed such that the entire attachment member 20 is accommodated in the attachment recess 19. When the attachment member 20 is mounted to the attachment recess 19, the rear end surface of the attachment member 20 is configured to be disposed forward of the aperture plane of the attachment recess 19. As illustrated in FIGS. 4 and 9, the attachment member 20 includes interlocking portions 20a that are composed of hook-shaped interlocking pieces. The interlocking pieces are integrally formed in three positions on the inner peripheral side of the front end portion of the attachment member 20 so as to be equally spaced, and are elastically interlocked with the interlocked portion 19a of the attachment recess 19. The interlocking portions 20a are elastically deformably provided because they are interlocking pieces made of synthetic resin. The minimum inner diameter of the attachment member 20 (i.e., diameter of a supposed circle supposedly connecting the tips of three interlocking portions 20a) is configured to be slightly smaller than the outer diameter of the support portion 18b and also configured to be slightly larger than the outer diameter of the bottom portion of the interlocked portion 19a such that the tips of the interlocking portions 20a are elastically engaged with the rear surface of the interlocked portion 19a when the attachment member 20 is mounted to the attachment recess 19.

As illustrated in FIG. 9, the attachment member 20 includes a plurality of circular arc-shaped interlocking protrusions 20b that are formed to protrude from the peripheral surface of the front end of the attachment member 20 and are arranged to be unequally spaced in the peripheral direction. The interlocking protrusions 20b are allowed to be interlocked with interlocking hollows 19b (see FIG. 8) that are circular arc-shaped cutout recesses formed on the outer peripheral surface of the support portion 18b. The interlocking protrusions 20b are disposed between adjacent three interlocking portions 20a, and are formed to integrally protrude toward the inner peripheral side. When the interlocking protrusions 20b are engaged with the interlocking hollows 19b, it is possible to position the attachment member 20 with respect to the support portion 18a and prevent the attachment member 20 from rotating in the peripheral direction with respect to the support portion 18a. As illustrated in FIG. 9, the attachment member 20 includes bosses 20c. The bosses 20c are formed in two positions on the outer periphery in the peripheral direction, and a portion thereof is formed in the circular arc shape to protrude outward in the diameter direction. The circular arc-shaped protruding portion of the boss 20c is configured to be engaged with the engaging hollows 19c (see FIG. 8) that is formed to be dented on the inner peripheral surface of the cylindrical portion 16. Here, when the bosses 20c are engaged with the engaging hollows 19c, the large diameter bosses 20c protruding outward in the diameter direction are allowed to be relieved.

Figure 10:
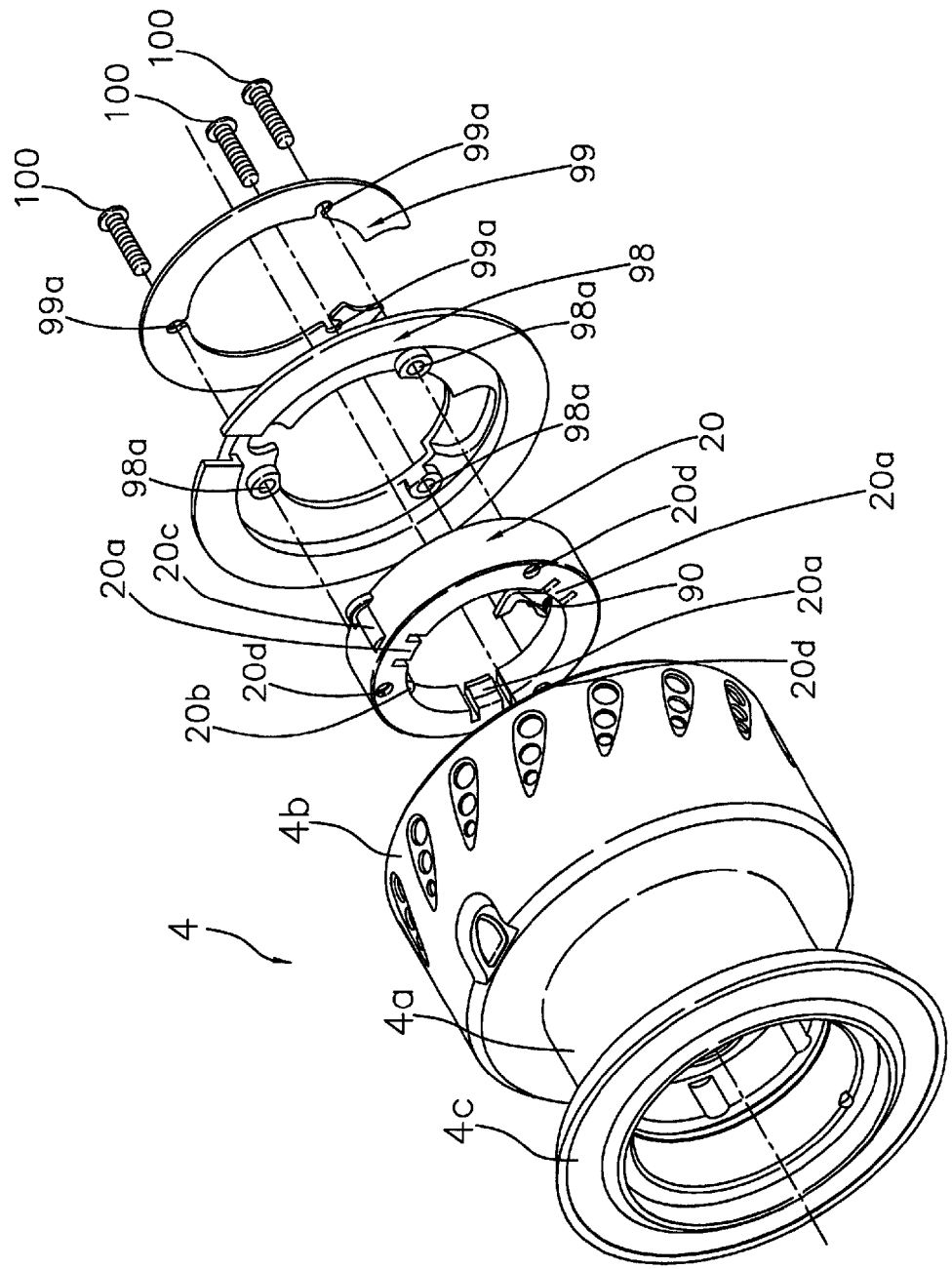
FIG. 10 is an exploded perspective view of the spool and the attachment member.

As illustrated in FIGS. 4 and 10, an annular member 98 whose diameter is larger than that of the attachment member 20 is attached to the rear portion of the attachment member 20 while the sound producing mechanism 90 is mounted to the rear portion of the attachment member 20, and an annular plate-shaped member 99, a portion of which is cut out, is attached to the rear portion of the annular member 98. The attachment member 20 includes three female threaded holes 20d that are formed to be arranged at predetermined intervals. The annular member 98 and the plate-shaped member 99 are allowed to be fixed to the attachment member 20 when three through holes 98a formed in the annular member 98 and three through holes 99a formed in the plate-shaped member 99 are disposed to be communicated with each other and then three screw members 100 are inserted into these holes from the back side and are fastened in the position. Here, the sound producing mechanism 90 is prevented form being detached from the attachment member 20 when the annular member 98 and the plate-shaped member 99 are fixed to the attachment member 20 while the sound producing mechanism 90 is mounted to the rear portion of the attachment member 20.

Figure 7:
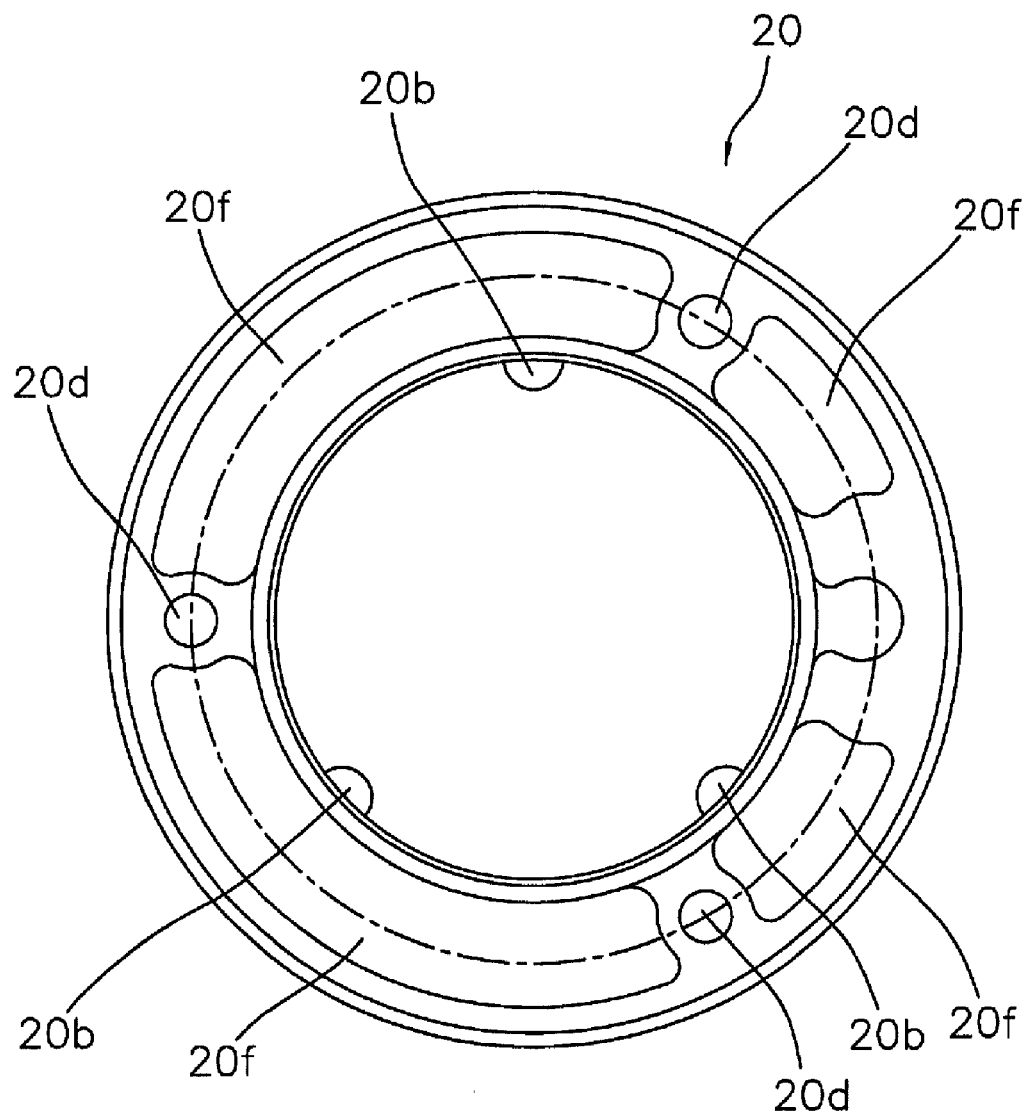
FIG. 7 is a rear view of the attachment member.

As illustrated in FIG. 7, a plurality of hollowed-out portions 20f are formed to be dented in the rear surface of the attachment member 20. The hollowed-out portions 20f are circular arc-shaped recesses that are arranged not to overlap three female threaded holes 20d, and are configured not to be exposed to outside (i.e., backward) when the annular member 98 and the plate-shaped member 99 are mounted to the rear portion of the attachment member 20. Here, it is possible to reduce weight of the attachment member 20 with a configuration that the hollowed-out portions 20f are formed in the attachment member 20 and the recesses are not exposed to outside by the attachment of the annular member 98 and the plate-shaped member 99.

As illustrated in FIGS. 4 and 5, the sound producing mechanism 90 includes a sound producing member 91, the hitting member 92, and an urging member 93. The sound producing member 91 is non-rotatably mounted to the spool shaft 15 and includes a concave-convex portion 91a for producing sounds on the outer periphery thereof. The hitting member 92 is mounted to the spool 4 so as not to relatively rotate with the spool 4, and produces sounds by repeatedly making contact with the concave-convex portion 91a when the spool 4 rotates in the line-releasing direction. The urging member 93 urges the hitting member 92 toward the sound producing member 91. The sound producing member 91 is a metal tubular ratchet wheel that is non-rotatably mounted to the spool shaft 15, and the concave-convex portion 91a for producing sounds is formed on the outer periphery of the sound producing member 91. The concave-convex portion 91a is formed on the outer peripheral surface of the tubular portion so as to be arranged in the peripheral direction at predetermined intervals, and is formed in a saw tooth shape so as to allow the spool 4 to rotate only in the line-releasing direction. The inner peripheral portion of the sound producing member 91 is non-rotatably fixed to the spool shaft 15, and also functions as a member for preventing the spool 4 from moving backward. The hitting member 92 is mounted to the rear surface of the attachment member 20 by a bolt member 94 so as to be allowed to pivot around an axis that is parallel to the spool shaft 15. The hitting member 92 is also a hook-shaped pawl member including a pawl portion 92a that produces sounds by repeatedly making contact with the concave-convex portion 91a. As illustrated in FIG. 4, the hitting member 92 is attached such that the base end portion thereof is disposed in the inner peripheral portion of the bobbin trunk 4a. The urging member 93 is a member that is wound around the bolt member 94 mounted to the rear end surface of the attachment member 20 and urges the hitting member 92 toward the direction in which the pawl portion 92a makes contact with the concave-convex portion 91a. In the sound producing mechanism 90 with the above configuration, the pawl portion 92a repeatedly makes contact with low-angle surfaces of the concave-convex portion 91a when the spool 4 rotates in the line-releasing direction, and accordingly sounds are produced.

The drag mechanism 60 brakes rotation of the spool 4, and includes a drag adjustment knob 61 that is screwed onto the tip of the spool shaft 15, and a braking member 62 that brakes the spool 4 when it is pressed by the drag adjustment knob 61. As illustrated in FIG. 4, the drag adjustment knob 61 includes a circular knob member 63 that is screwed onto the spool shaft 15, a knob clasp 65 that is fixed to the knob member 63, and a pressing member 64 that is allowed to relatively rotate with the knob member 63 and is pressed by the knob member 63. As illustrated in FIG. 4, the braking member 62 includes a plurality of drag washers that are accommodated in the interior of the bobbin trunk 4a.

Next, the operation and movement of the reel will be described.

When casting, the bail arm 44 is flipped over to the line-releasing posture. Thus, the first bail support member 40 and the second bail support member 42 swing. In this situation, the fishing rod is cast while the fishing line is hooked by the index finger of the hand with which the fishing rod is held. Accordingly, fishing line is released with high momentum due to the weight of the tackle. After the tackle lands on the water, when the handle 1 is rotated in the line-winding direction, the rotor 3 rotates in the line-winding direction by means of the rotor driving mechanism 5, and the bail arm 44 returns to the line-winding posture by means of the bail flipping mechanism 53. Thus, fishing line is prevented from being released because the reverse rotation of the rotor 3 is prevented.

When fishing line is wound in, the handle 1 is rotated in the line-winding direction. When this occurs, the rotation is then transmitted to the rotor 3 through the face gear 11 and the pinion gear 12, and thus the rotor 3 rotates. When the rotor 3 rotates, fishing line guided by the line roller 41 is wound around the spool 4. Also, when the spool 4 rotates in the line-releasing direction as the result of drag operation, as described above, the pawl portion 92a repeatedly makes contact with the low-angle surfaces of the concave-convex portion 91a and accordingly the sound producing mechanism 90 produces sounds.

In the spool 4 of a spinning reel with the above configuration, the annular attachment member 20 to which the hitting member 92 of the sound producing mechanism 90 is attached is detachably/reattachably mounted and fixed in the attachment recess 19 that is formed to be annularly dented in the inner peripheral portion of the bobbin trunk 4a. Here, the annular attachment member 20 is completely mounted in the attachment recess 19 that is formed to be annularly concaved. Accordingly, it is possible to easily attach the attachment member 20 to the attachment recess 19, and it is also possible to uniformly maintain the weight balance of a spool 4 in the peripheral direction. In addition, here, the attachment member 20 is mounted in the attachment recess 19. Thus, the attachment member 20 is not likely to protrude backward from a rear end portion of the bobbin trunk 4a, compared to the conventional configuration. Accordingly, it is possible to compactly dispose the spool 4.

In the spool 4 of this type of spinning reel, the interlocking portion 20a of the attachment member 20 to which the hitting member 92 of the sound producing mechanism 90 is attached is elastically interlocked with the interlocked portion 19a of the attachment recess 19, and thus the attachment member 20 to which the sounds producing mechanism 90 is disposed is allowed to be attached/detached to/from the attachment recess 19 without a screw member that has been used in the conventional configurations. Accordingly, it is possible to easily perform attachment/detachment of the sound producing mechanism 90.

Figure 11:
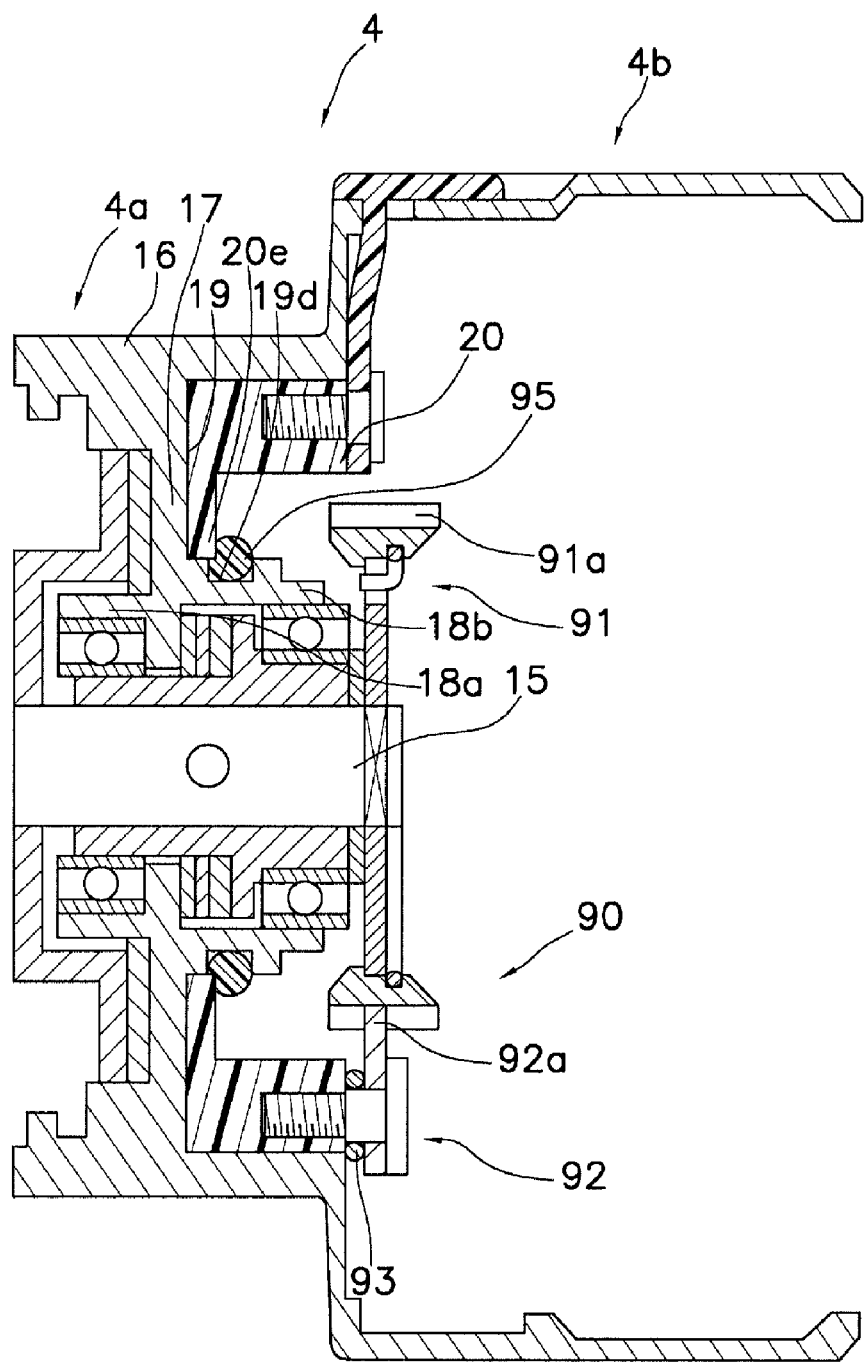

OTHER EMBODIMENTS (a) In the above described embodiment, the attachment member 20 is fixed to the attachment recess 19 by elastically interlocking the interlocking portion 20a of the attachment member 20 with the interlocked portion 19a of the attachment recess 19. However, as illustrated in FIG. 11, the attachment member 20 may be elastically interlocked with the attachment recess 19 by an elastic O-ring 95. The attachment member 20 illustrated in FIG. 11 is a closed-end tubular annular member and is mounted so as to make contact with the inner peripheral surface of the rear portion of the cylindrical portion 16 that corresponds to the wall portion of the attachment recess 19 and the disk portion 17 that corresponds to the bottom portion of the attachment recess 19. A portion of the attachment member 20, which makes contact with the disk portion 17, is formed in a plate shape so that it extends toward the inner peripheral side so as to reach the support portion 18b that is also a tubular flange portion. The front end portion 20e of the attachment member 20 is pressed to the rear surface of the disk portion 17 that corresponds to the bottom portion of the attachment recess 19 by the elastic O-ring 95 that is mounted to a mounting groove 19d formed to be dented on the outer peripheral surface of the support portion 18b. A rear side wall portion of the mounting groove 19d is disposed rearward of a front side wall surface of the front end portion 20e of the attachment member 20. Therefore, the front end portion 20e of the attachment member 20 is allowed to be pressed frontward by the elastic O-ring 95. Here, the attachment member 20 is elastically interlocked with the attachment recess 19 by the elastic O-ring 95, and accordingly it is possible to attach/detach the attachment member 20 in which the sound producing mechanism 90 is provided to/from the attachment recess 19 without using a tool such as a driver. In other words, it is possible to easily perform attachment/detachment of the sound producing mechanism 90.

Figure 12:
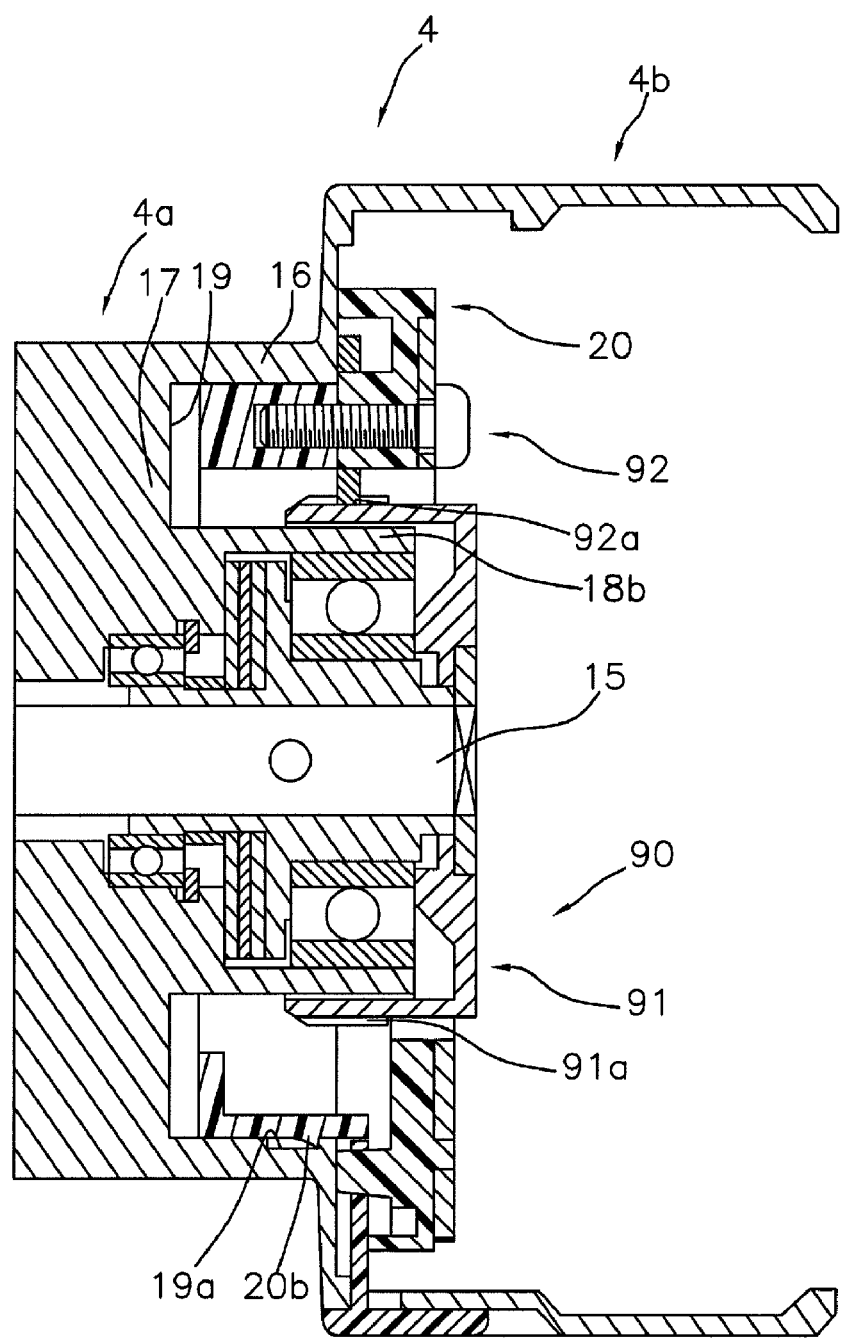

(b) In the above described embodiment, the interlocked portion 19a is formed on the outer peripheral side of the support portion 18b that is a tubular flange portion, and the interlocking portion 20a is formed on the inner peripheral side of the front end portion of the attachment member 20. Furthermore, the attachment member 20 is fixed to the attachment recess 19 by elastically interlocking the interlocking portion 20a of the attachment member 20 with the interlocked portion 19a of the attachment recess 19. However, as illustrated in FIG. 12, the interlocking part is configured to include an interlocked portion 19a that is an annular groove formed on the inner peripheral side of the bobbin trunk 4a and an interlocking portion 20a that is formed on the outer peripheral side of the front end portion of the attachment member 20 and is elastically interlocked with the interlocked portion 19a, and is configured to elastically interlock the interlocking portion 20a of the attachment member 20 with the interlocked portion 19a of the attachment recess 19. Here, the interlocking portion 20a of the attachment member 20 is interlocked with the interlocked portion 19a formed on the inner peripheral side of the bobbin trunk 4a, and the attachment member 20 in which the sound producing mechanism 90 is provided is elastically interlocked with the bobbin trunk 4a. Accordingly, it is possible to easily perform attachment/detachment of the sound producing mechanism 90.

Figure 13:
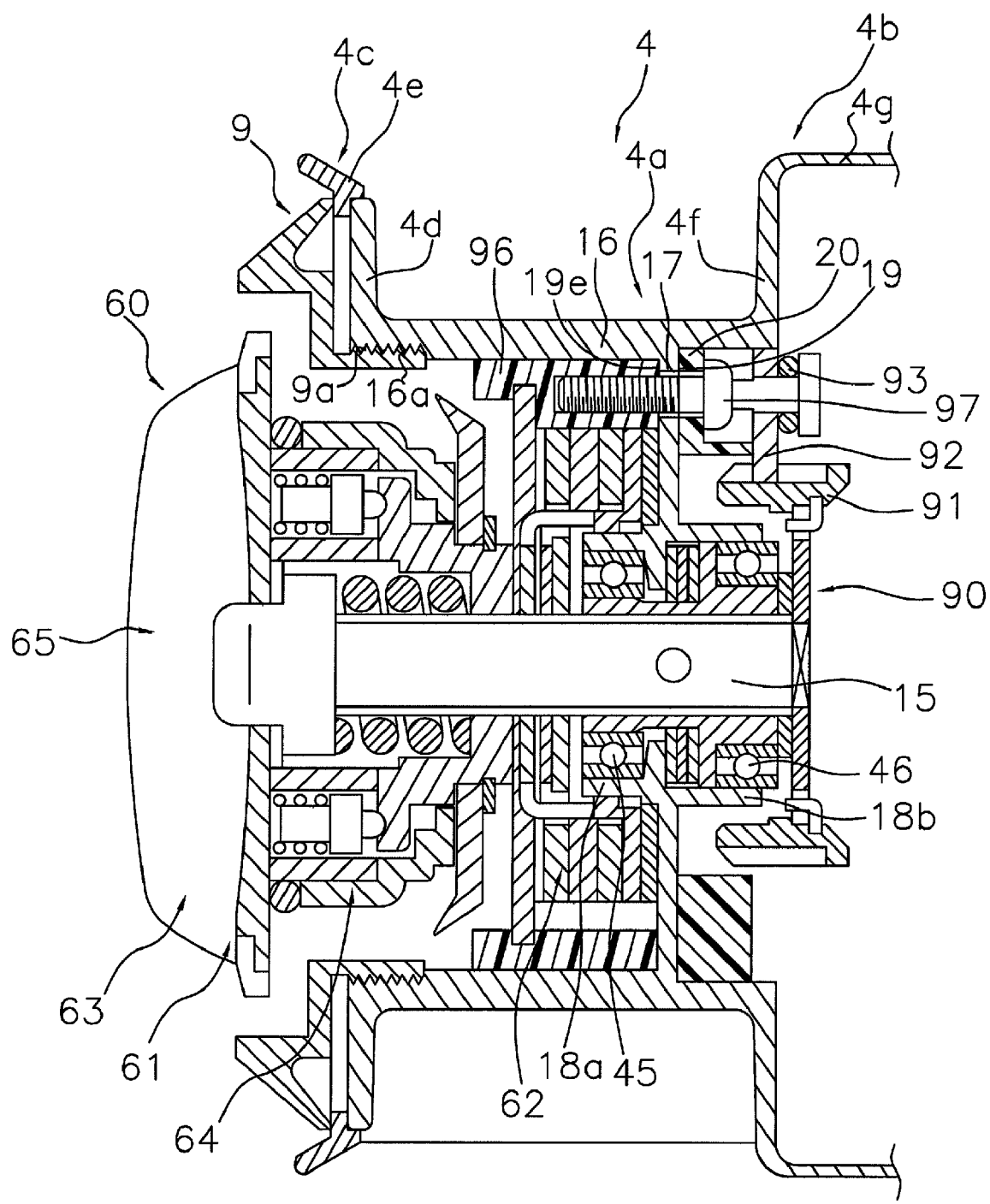
FIG. 13 is a view of another embodiment corresponding to FIG. 4.

(c) In the above described embodiment, the attachment member 20 is fixed to the attachment recess 19 by elastically interlocking the interlocking portion 20a of the attachment member 20 with the interlocked portion 19a of the attachment recess 19. However, a method for fixing the attachment member 20 to the attachment recess 19 is not limited to elastic interlocking. As illustrated in FIG. 13, the attachment member 20 may be fixed to the attachment recess 19 by screwing a coupling member 97 into the attachment recess 19 such that the disk portion 17 is interposed between the attachment member 20 and a mounting member 96.

The attachment member 20 illustrated in FIG. 13 is an annular member that is mounted so as to make contact with the inner peripheral surface of the rear portion of the cylindrical portion 16 that corresponds to the wall portion of the attachment recess 19 and the disk portion 17 that corresponds to the bottom portion of the attachment recess 19. In addition, the mounting recess 19e is provided in the front portion of the disk portion 17. The mounting recess 19e is formed to be annularly dented on the inner peripheral side of the cylindrical portion 16 such that the front portion thereof is opened, and the bottom surface thereof corresponds to the front surface of the disk portion 17. Furthermore, the annular mounting member 96 is detachably/reattachably mounted in the remounting recess 19e from the front side. Here, the attachment member 20 is mounted to the mounting recess 19 from the back side so as to make contact with the rear surface of the disk portion 17 while the mounting member 96 is mounted to the mounting recess 19e so as to make contact with the front surface of the disk portion 17. Thus, the disk portion 17 is configured to be interposed and supported between the attachment member 20 and the attachment recess 19. Furthermore, the coupling member 97, which is a bolt member, is inserted from the back side and is screwed into the mounting member 96. Thus, the attachment member 20 and the mounting member 96 are configured to be coupled while the disk portion 17 is interposed and supported between the attachment member 20 and the mounting member 96. In this configuration, it is possible to thinly form the thickness of the disk portion 17, compared to a configuration in which a threaded hole is formed in the disk portion 17, for instance. Accordingly, it is possible to reduce the entire weight of the spool 4.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A spool of a spinning reel, comprising:
    a cylindrical bobbin trunk having an outer periphery around which fishing line is wound and an inner periphery;
    a front flange portion configured on the outer periphery at a front portion of the bobbin trunk, and outwardly and annularly protruding in a diameter direction, the front portion being on a front side of the reel where the wound fishing line is released;
    a rear flange portion configured on the outer periphery at a rear portion of the bobbin trunk, and outwardly and annularly protruding in the diameter direction, the rear portion configured opposite to the front portion;
    a cylindrical skirt portion extending in an axial direction towards a rear side of the reel opposite to the front side from a front end portion of the rear flange portion, the front end portion being on the front side of the reel;
    a disk portion configured on the inner periphery of the cylindrical bobbin trunk and annularly and inwardly protruding in the diameter direction, the disk portion forming with the cylindrical bobbin trunk an attachment recess within the cylindrical bobbin trunk on the side of the rear side of the reel;
    an annular attachment member being detachably fixed in the attachment recess, the annular attachment member attachable to the attachment recess after being detached; and
    a sound producing mechanism configured to produce sounds when the sound producing mechanism relatively rotates with a spool shaft unrotatably configured on a axial center of the cylindrical bobbin trunk, at least a portion of the sound producing mechanism being fixed in the attachment recess.

2. The spool of the spinning reel according to claim 1, further comprising
    a first support portion annularly configured on the disk portion and extending on the axial direction towards the rear side of the reel, the first support portion forming with the inner periphery and the disk portion the attachment recess being an annular concave on the side of the rear side of the reel.

3. The spool of the spinning reel according to claim 2, further comprising
    a second support portion annularly configured on the disk portion and extending on the axial direction towards the front side of the reel, the second support portion forming with the inner periphery and the disk portion a mounting recess being an annular concave on the front side of the reel,
    an annular mounting member being detachably fixed in the mounting recess, the annular mounting member being attachable to the mounting recess after being detached, and
    a coupling member coupling the annular attachment member and the annular mounting member while the disk portion is disposed between and supported by the annular attachment member and the annular mounting member.

4. The spool of the spinning reel according to claim 3, wherein
the coupling member is a screw member being inserted either from a rear end portion of the attachment member or from a front end portion of the mounting member, the rear end portion facing the rear side of the reel, the front end portion facing the front side of the reel,
the disk portion has a first through hole into which the screw member is inserted,
one of the annular attachment member and the annular mounting member includes a second through hole into which the screw member is inserted, and
the other of the annular attachment member and the annular mounting member includes a threaded hole that communicates with the through hole and in which the screw member is screwed.

5. The spool of the spinning reel according to claim 4, wherein
the annular attachment member has a rear end surface facing the rear side of the reel, the rear end surface configured within the bobbin trunk.

6. The spool of the spinning reel according to claim 5, wherein
the sound producing mechanism includes
a sound producing member being unrotatable, being mounted to the spool shaft, and having a concave-convex portion that produces sounds on an outer peripheral surface of the sound producing member,
a hitting member having a base end portion being fixed to the annular attachment member and a front end portion that repeatedly contacts with the concave-convex portion to produce sounds when the spool rotates, and
an urging member urging the hitting member towards the sound producing member.

7. The spool of the spinning reel according to claim 6, wherein
the base end portion is disposed in within the bobbin trunk.

8. The spool of the spinning reel according to claim 2, further comprising
a mechanism relatively rotates with the spool shaft, wherein
the first support portion has an interlocked portion,
the annular attachment member has an interlocking portion being elastically interlocked with the interlocked portion to fix the annular attachment member to the attachment recess, and
the annular attachment member is detachably fixed to the from the side of the rear side of the reel, the annular attachment member being attachable to the attachment recess.

9. The spool of the spinning reel according to claim 8, wherein
the interlocking portion is an elastic O-ring.

10. The spool of the spinning reel according to claim 9, wherein
the interlocked portion is a first interlocking groove, and
the interlocking portion is a first interlocking piece being integrally formed in an outer peripheral side of a front end portion of the annular attachment member and is elastically interlocked with the first interlocking groove, the front end portion being on the side of the front side of the reel.

11. The spool of the spinning reel according to claim 8, wherein
the interlocked portion is a second interlocking groove, and
the interlocking portion is a second interlocking piece being integrally formed in an inner peripheral side of a front end portion of the annular attachment member and is elastically interlocked with the second interlocking groove, the front end portion being on the side of the front side of the reel.

12. The spool of the spinning reel according to one of claim 2, wherein
the first support portion has a plurality of interlocked portions,
the annular attachment member has a plurality of interlocking portions each of which is elastically interlocked with each of the interlocked portion to fix the annular attachment member to the attachment recess, and
the annular attachment member is detachably fixed to the first support portion from the side of the rear side of the reel, the annular attachment member being attachable to the attachment recess after being detached.

13. The spool of the spinning reel according to claim 1, wherein
the sound producing mechanism includes
a hitting member having a base end portion being fixed to the annular attachment member and a front end portion, and
an urging member urging the hitting member towards the sound producing member.

14. The spool of the spinning reel according to claim 13, wherein
the sound producing mechanism includes
a sound producing member being unrotatable, being mounted to the spool shaft, and having a concave-convex portion to produce sounds on an outer peripheral surface of the sound producing member, wherein
the front end portion of the hitting member contacts with the concave-convex portion to produce sounds when the spool rotates.

15. The spool of the spinning reel according to claim 1, wherein
the cylindrical bobbin trunk, the front flange portion, the rear flange portion, and the skirt portion are integrally formed by a metal member, and
the first annular attachment member is made of a synthetic resin.

* * * * *